(12) United States Patent
Wolk et al.

(10) Patent No.: US 12,461,276 B2
(45) Date of Patent: Nov. 4, 2025

(54) REFLECTIVE OPTICAL METASURFACE FILMS

(71) Applicant: 3M INNOVATIVE PROPERTIES COMPANY, St. Paul, MN (US)

(72) Inventors: Martin B. Wolk, Woodbury, MN (US); Robert L Brott, Woodbury, MN (US); Karl K. Stensvad, Eagan, MN (US); Vadim N. Savvateev, St. Paul, MN (US); James M. Nelson, Lino Lakes, MN (US); Lin Zhao, Woodbury, MN (US); Caitlin Race, Stillwater, MN (US); Adam D. Haag, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 481 days.

(21) Appl. No.: 17/919,368

(22) PCT Filed: Apr. 9, 2021

(86) PCT No.: PCT/IB2021/052955
§ 371 (c)(1),
(2) Date: Oct. 17, 2022

(87) PCT Pub. No.: WO2021/220089
PCT Pub. Date: Nov. 4, 2021

(65) Prior Publication Data
US 2023/0184996 A1     Jun. 15, 2023

Related U.S. Application Data

(60) Provisional application No. 63/018,547, filed on May 1, 2020.

(51) Int. Cl.
*G02B 1/00* (2006.01)
*C23C 14/10* (2006.01)
(Continued)

(52) U.S. Cl.
CPC .............. *G02B 1/002* (2013.01); *C23C 14/10* (2013.01); *C23C 14/205* (2013.01);
(Continued)

(58) Field of Classification Search
CPC ...... G02B 1/002; G02B 5/305; G02B 5/3066; G02B 2207/101; G02B 5/3058
(Continued)

(56) References Cited

U.S. PATENT DOCUMENTS 3,610,729 A    10/1971   Rogers
4,446,305 A     5/1984   Rogers et al.
(Continued)

FOREIGN PATENT DOCUMENTS

CN    110727037 A    1/2020
CN    111061070 A    4/2020
(Continued)

OTHER PUBLICATIONS

International Search Report for PCT Application No. PCT/IB2021/052955, mailed on Jul. 8, 2021, 3 pages.
(Continued)

*Primary Examiner* — Ricky D Shafer

(57) ABSTRACT

An optical metasurface film includes a flexible polymeric film having a first major surface, a patterned polymer layer having a first surface proximate to the first major surface of the flexible polymeric film and having a second nanostructured surface opposite the first surface, and a refractive index contrast layer including a refractive index contrast material adjacent to the nanostructured surface of the patterned polymer layer forming a nanostructured bilayer with a nano structured interface. The nanostructured bilayer comprising a plurality of nanostructures disposed on the flexible polymeric film. The nanostructured bilayer imparts a light phase shift that varies as a function of position of the nano
(Continued)

structured bilayer on the flexible polymeric film. The light phase shift of the nanostructured bilayer defines a predetermined operative phase profile of the optical metasurface film. A light reflecting layer is in optical communication with the nano structured bilayer.

18 Claims, 8 Drawing Sheets

(51) Int. Cl.
   *C23C 14/20* (2006.01)
   *C23C 14/34* (2006.01)
   *G02B 5/30* (2006.01)
(52) U.S. Cl.
   CPC .......... *C23C 14/3464* (2013.01); *G02B 5/305* (2013.01); *G02B 5/3066* (2013.01); *G02B 2207/101* (2013.01)
(58) Field of Classification Search
   USPC .................................................. 359/485.03
   See application file for complete search history.

(56) References Cited

U.S. PATENT DOCUMENTS

| | | | |
|---|---|---|---|
| 4,540,623 A | | 9/1985 | Im et al. |
| 4,847,137 A | | 7/1989 | Kellen et al. |
| 5,448,404 A | | 9/1995 | Schrenk et al. |
| 5,882,774 A | | 3/1999 | Jonza et al. |
| 6,101,032 A | * | 8/2000 | Wortman ............. G02B 27/283 |
| | | | 359/485.02 |
| 6,449,093 B2 | | 9/2002 | Hebrink et al. |
| 6,451,414 B1 | | 9/2002 | Wheatley et al. |
| 6,667,095 B2 | | 12/2003 | Wheatley et al. |
| 7,104,776 B2 | | 9/2006 | Merrill et al. |
| 7,718,264 B2 | | 5/2010 | Klun et al. |
| 8,164,721 B2 | | 4/2012 | Tan et al. |
| 9,739,912 B2 | * | 8/2017 | Tai .................... G02B 19/0042 |
| 9,790,396 B2 | | 10/2017 | Klun et al. |
| 9,910,192 B2 | | 3/2018 | Hao et al. |
| 10,073,191 B2 | | 9/2018 | Shen et al. |
| 10,698,147 B2 | | 6/2020 | Takeda |
| 10,747,045 B2 | * | 8/2020 | Oh .................... G02F 1/133502 |
| 12,248,118 B2 | * | 3/2025 | Wolk .................... G02B 5/1809 |
| 2005/0243447 A1 | * | 11/2005 | Lee .................... G02B 5/3058 |
| | | | 359/865 |
| 2007/0047080 A1 | | 3/2007 | Stover et al. |
| 2009/0046362 A1 | * | 2/2009 | Guo ..................... B82Y 10/00 |
| | | | 427/457 |
| 2009/0209420 A1 | | 8/2009 | Kalgutkar et al. |
| 2011/0102891 A1 | | 5/2011 | Derks et al. |
| 2011/0188807 A1 | | 8/2011 | Fattal et al. |
| 2013/0211310 A1 | | 8/2013 | Bommarito et al. |
| 2014/0314374 A1 | | 10/2014 | Fattal et al. |
| 2015/0369984 A1 | | 12/2015 | Johnson et al. |
| 2016/0249461 A1 | * | 8/2016 | Gilman .................. G06F 3/041 |
| 2016/0341861 A1 | * | 11/2016 | Li .................... B29D 11/00644 |
| 2018/0081103 A1 | | 3/2018 | Takeda |
| 2018/0217395 A1 | | 8/2018 | Lin et al. |
| 2018/0292588 A1 | | 10/2018 | Coggio et al. |
| 2018/0363148 A1 | | 12/2018 | Feigenbaum |
| 2019/0051863 A1 | | 2/2019 | Gangopadhyay et al. |
| 2019/0064532 A1 | | 2/2019 | Riley, Jr. et al. |
| 2019/0301025 A1 | | 10/2019 | Akselrod et al. |
| 2019/0386251 A1 | | 12/2019 | Erickson et al. |
| 2020/0003936 A1 | | 1/2020 | Fu et al. |
| 2021/0216009 A1 | | 7/2021 | Cheng et al. |
| 2021/0347135 A1 | * | 11/2021 | Van Lengerich ...... G02B 1/002 |

FOREIGN PATENT DOCUMENTS

| | | |
|---|---|---|
| GB | 2535515 A | 8/2016 |
| JP | 2011248213 A | 12/2011 |
| JP | 2016212156 A | 12/2016 |
| WO | 2008124180 A1 | 10/2008 |
| WO | 2009011172 A1 | 1/2009 |
| WO | 2016148689 A1 | 9/2016 |
| WO | 2017176921 A1 | 10/2017 |
| WO | 2018140651 A1 | 8/2018 |

OTHER PUBLICATIONS

Liu, "S 4: A Free Electromagnetic Solver for Layered Periodic Structures", Computer Physics Communications, Oct. 2012, vol. 183, No. 10, pp. 2233-2244.

Shen, "Optical Broadband Angular Selectivity", Science, Mar. 2014, vol. 343, No. 6178, pp. 1499-1501.

Shi, "All-Dielectric Kissing-Dimer Metagratings for Asymmetric High Diffraction", Advanced Optical Materials, 2019, vol. 7, No. 24, pp. 1901389-1-1901389-6.

Yu, "Flat Optics with Designer Metasurfaces", Nature Materials, Feb. 2014, vol. 13, pp. 139-150.

* cited by examiner

REFLECTIVE OPTICAL METASURFACE FILMS

CROSS REFERENCE TO RELATED APPLICATIONS

This application is a national stage filing under 35 U.S.C. 371 of PCT/IB2021/052955, filed Apr. 9, 2021, which claims the benefit of U.S. Provisional Application No. 63/018,547, filed May 1, 2020, the disclosures of which are incorporated by reference in their entireties herein.

BACKGROUND

Metamaterials are synthetic composite materials having nano-scale features on at least one surface. When the nano-scale features are selected to have at least one dimension less than the wavelength of light impinging on the surface, the metamaterials may exhibit properties not readily obtainable using conventional materials and techniques. Metamaterials may have simple surface structures such as a single or small number of patterned layers or more complex surface structures such as stacked patterned layers, often in registration to each other, such that the individual nano-scale features interact electromagnetically with impinging radiation according to their design.

Metamaterials with a single or small number of patterned layers are called metasurfaces. Metasurfaces having nano-scale surface features have recently found applications in optics, bio-sensing, semiconductors and other electronic devices.

Metasurfaces have been formed on rigid surfaces using e-beam lithography and atomic layer deposition, for example. These materials have been formed on substrates having a limited surface area. These materials have been formed on wafer substrates having a diameter of 300 mm or less.

SUMMARY

Optical metasurface polymeric films are described. These optical metasurface polymeric films may be formed on flexible substrates and include a light reflecting layer such as a multilayer optical film. The flexible substrate may be large format substrates having a lateral dimension greater than 300 mm, for example. These optical metasurface polymeric films may be formed utilizing roll-to-roll processing with high fidelity.

An optical metasurface film includes a flexible polymeric film having a first major surface, a patterned polymer layer having a first surface proximate to the first major surface of the flexible polymeric film and having a second nanostructured surface opposite the first surface, and a refractive index contrast layer including a refractive index contrast material adjacent to the nanostructured surface of the patterned polymer layer forming a nanostructured bilayer with a nanostructured interface. The nanostructured bilayer comprising a plurality of nanostructures disposed on the flexible polymeric film. The nanostructured bilayer acts locally on an amplitude, phase, or polarization of light, or a combination thereof and imparts a light phase shift that varies as a function of position of the nanostructured bilayer on the flexible polymeric film. The light phase shift of the nanostructured bilayer defines a predetermined operative phase profile of the optical metasurface film. A light reflecting layer is in optical communication with the nanostructured bilayer.

The light reflecting layer may separate the flexible polymeric film from the nanostructured bilayer. The nanostructured bilayer may separate the light reflecting layer from the flexible polymeric film.

The optical metasurface film may further include a second light reflecting layer. The nanostructured bilayer may separate the light reflecting layer from the second light reflecting layer.

Light reflected from the light reflecting layer may be altered by the nanostructured bilayer. The light reflected has a wavelength value in a range from 380 to 1600 nm, or from 280 to 750 nm, or from 750 to 1600 nm.

Light transmitted through the light reflecting layer may be altered by the nanostructured bilayer. The light transmitted has a wavelength value in a range from 380 to 1600 nm, or from 280 to 750 nm, or from 750 to 1600 nm.

The light reflecting layer may comprise multilayer optical film. The light reflecting layer may comprise polymeric multilayer optical film. The light reflecting layer may comprises a polarizer.

The nanostructured bilayer may act locally on the amplitude of light. The nanostructured bilayer may act locally on the phase of light. The nanostructured bilayer may act locally on the polarization of light.

The nanostructured bilayer may be defined by solid materials. The nanostructured bilayer may be formed of solid materials. The nanostructured bilayer may be formed of polymeric materials.

The nanostructured bilayer may further include an etch stop layer separating the patterned polymer layer from the first major surface of the flexible polymeric film.

The refractive index contrast material may have a first refractive index value and the patterned polymer layer has a second refractive index value being at least 0.25 different than, or 0.5 different than, or 0.75 different than, or 1.0 different than, or 1.4 different than the first refractive index value.

The nanostructured bilayer may be defined by a plurality of nanostructures embedded into the refractive index contrast layer. The nanostructures forming the nanostructured surface may have an aspect ratio of at least about 1:1, 2:1, 5:1, 10:1 or 15:1. The nanostructures forming the nanostructured surface preferably may have an aspect ratio in a range of about 2:1 to about 20:1, or from about 4:1 to about 15:1.

The nanostructures forming the nanostructured surface may define a tapered sidewall having an angle in a range from about 1 to 10 degrees, 2 to 10 degrees, 3 to 10 degrees, 4 to 10 degrees, 1 to 6 degrees, 2 to 6 degrees, or 3 to 6 degrees, or 2 to 4 degrees. The nanostructures forming the nanostructured surface may define a tapered sidewall having an angle in a range from about 0 to 10 degrees, 0 to 6 degrees, 0 to 3 degrees, 0 to 2 degrees, 0 to 1 degree, or 0 degrees.

The refractive index contrast material may include a metal oxide or metal nitride. The refractive index contrast material may include at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

The patterned polymer layer may include a fluoropolymer, (meth)acrylate (co)polymer, or silica containing polymers. The patterned polymer layer may include fluoroacrylate and the refractive index contrast material may include titanium dioxide. The patterned polymer layer may include (meth)acrylate and the refractive index contrast material may include titanium dioxide.

The flexible polymeric film may have a nominal thickness in a range from about 5 micrometers to about 300 micrometers. The nanostructures forming the nanostructured surface may have a height of 5 micrometer or less, or in a range from about 100 nanometers to about 3000 nanometers, or from about 500 nanometers to about 1500 nanometers.

The nanostructures forming the nanostructured surface has a nominal pitch (center-to-center distance between adjacent nanostructures) that is subwavelength with respect to the shortest wavelength contained in the interrogating electromagnetic radiation. For optical metasurfaces operating in the visible spectral range, the nanostructures forming the nanostructured surface may have a nominal pitch of 600 nanometers or less, or 500 nanometers or less, or 400 nanometers or less. For optical metasurfaces operating in the visible spectral range, the nanostructures forming the nanostructured surface may preferably have a nominal pitch of 50 nanometers to 600 nanometers, or 100 nanometers to 500 nanometers, or 200 nanometers to 400 nanometers.

The nanostructures forming the nanostructured surface are each separated from each other (edge to edge) by a subwavelength lateral distance. The nanostructures forming the nanostructured surface may be each separated from each other by about 400 nanometers or less, or in a range from about 20 nanometers to about 400 nanometers, or from about 50 nanometers to about 300 nanometers.

The nanostructures forming the nanostructured surface have a lateral dimension orthogonal to a nanostructure feature height that is subwavelength. The nanostructures forming the nanostructured surface may have a lateral dimension orthogonal to a nanostructure feature height of about 600 nanometers or less, or in a range from about 10 nanometers to about 400 nanometers, or from about 50 nanometers to about 350 nanometers.

The light phase shift may occur in a visible light wavelength range. The light phase shift may occur in a near IR wavelength range. The optical metasurface film may transmit visible or near infrared light.

The nanostructures forming the nanostructured surface may have a varying orientation that depends on the location of the individual nanostructure on the flexible polymeric film. The nanostructures forming the nanostructured surface may have a varying spatial arrangement that depends on the location of the individual nanostructure on the flexible polymeric film. The nanostructures forming the nanostructured surface may have a varying that depends on the location of the individual nanostructure on the flexible polymeric film. The nanostructures forming the nanostructured surface may have a varying aspect ratio that depends on the location of the individual nanostructure on the flexible polymeric film.

The nanostructures forming the nanostructured surface may be geometrically anisotropic in a planar direction. The nanostructures forming the nanostructured surface may be geometrically isotropic in a planar direction.

Figure 1:
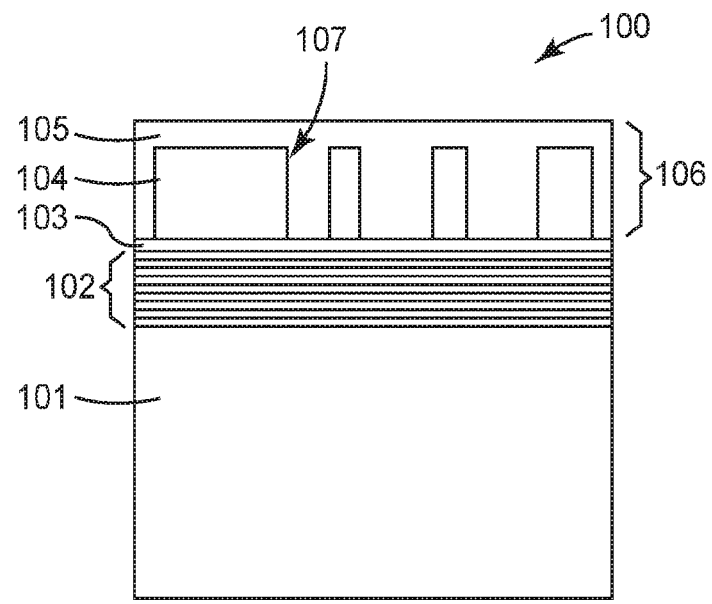
FIG. 1 is a cross-sectional schematic diagram of an illustrative optical metasurface film.

The schematic drawings are not necessarily to scale and are presented for purposes of illustration and not limitation. The drawings depict one or more aspects described in this disclosure. However, it will be understood that other aspects not depicted in the drawing fall within the scope and spirit of this disclosure.

DETAILED DESCRIPTION

Optical metasurface polymeric films are described. These optical metasurface polymeric films may be formed on flexible substrates and include a light reflecting layer such as a multilayer optical film. The flexible substrate may be large format substrates having a lateral dimension greater than 300 mm, for example. These optical metasurface polymeric films may be formed utilizing roll-to-roll processing with high fidelity.

All values reported as a percentage is presumed to be weight percent based on the total weight.

All scientific and technical terms used herein have meanings commonly used in the art unless otherwise specified. The definitions provided herein are to facilitate understanding of certain terms used frequently herein.

As used herein, the singular forms "a", "an", and "the" encompass embodiments having plural referents, unless the content clearly dictates otherwise.

As used herein, "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

The term "metasurface" refers to a two-dimensional subwavelength spacing or array of photonic resonators or truncated waveguides, which preform one or more optical functions. Each array locally acts on one or more physical properties of light, specifically, amplitude, phase, or polarization. Photonic resonators or truncated waveguides nano-feature shapes include, but are not limited to, rectangular, triangular and trapezoidal prisms; fins, cylindrical and truncated-cone shaped pillars etc. The features may be placed with regular, deterministic, or randomized pitch, orientation and shape, dependent on application-functionality and determined article design.

The term "nanostructure" refers to a feature having at least one dimension that is less than 1 micrometer.

The term "aspect ratio" refers to the ratio of feature height to feature width.

The term "refractive index" refers to the absolute refractive index of a material which is understood to be the ratio of the speed of electromagnetic radiation in free space to the speed of the radiation in that material, with the radiation being green light at a wavelength of about 532 nanometers (nm). The refractive index can be measured using known methods and is generally measured using an Abbe Refractometer.

The term "flexible polymeric film" refers to a polymeric film that may be elastically curved to a radius of curvatures of 52 mm or less.

The term "multilayer optical film" or "MOF" refers to a polymeric or dielectric stack of microlayers having differing refractive index to provide desirable transmission or reflection properties The term "operative phase profile" refers to the phase profile that is imparted by the metasurface on the incident electromagnetic radiation. It is designed to carry out specific optical functions.

The phrase "land region thickness" refers to the height of a structured surface layer between its bottom surface and the plane defined by the bottom of the surface features. Also referred to as the residual layer or region.

The term "precision land" refers to structured surface layers with a deterministic, controlled land thickness. Two examples are a minimized land that enables subsequent etch steps and a land that will define the feature height in the final film. Ideally, the thickness of the residual layer thickness will be less than the feature height when the structured surface enables subsequent etch steps. When the land thickness defines the height of the features in the final film, the land layer thickness ideally has variability that is <25%, more preferably <10%, and most preferably <5% of the layer thickness.

The term "uncontrolled land" refers to structured surface layers with an arbitrary land thickness. Layer thickness variability may be >25%.

For the purpose of the present description and of the appended claims, except where otherwise indicated, all numbers expressing amounts, quantities, percentages, and so forth, are to be understood as being modified in all instances by the term "about." Also, all ranges include the maximum and minimum points disclosed and include any intermediate ranges therein, which may or may not be specifically enumerated herein. In this context, therefore, a number A is understood as A±2% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed invention. Also, all ranges include the maximum and minimum points disclosed and include any intermediate ranges therein, which may or may not be specifically enumerated herein.

The reflective layer may be one or more of, a multilayer optical film or a metallic layer. A reflective metallic layer may be formed of any useful metal such as silver, aluminum, gold, copper, chromium, titanium, or zirconium. The reflective metallic layer may have any useful thickness for reflecting light. The reflective metallic layer may have a thickness in a range from 10 nanometers to 10 micrometers, or from 10 nanometers to 1 micrometer, or from 20 nanometers to 500 nanometers, or from 20 nanometers to 100 nanometers.

The light reflecting layer may be a multilayer optical film. The multilayer optical film may be formed of organic or inorganic layers. The multilayer optical film may be formed of inorganic layers. The inorganic multilayer optical film may have a thickness in a range from 0.5 to 2 micrometers, or from 0.5 to 1 micrometer. The inorganic light reflecting layer may have less than 20 layers or from 4 to 14 layers, wherein a refractive contrast between a high index layer and a low index layer is not less than 1.

The multilayer optical film may be formed of organic layers or polymeric layers. The polymeric multilayer optical film may have a total thickness in a range from 5 to 150 micrometers, or from 20 to 100 micrometers. The polymeric multilayer optical film may have from 20 to 1000 layers, wherein a refractive contrast between a high index layer and a low index layer is not less than 0.1, or not less than 0.01.

Multilayer optical films have been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods. The description and examples below relate to thermoplastic multilayer optical films.

A multilayer optical film may include individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.). The films, having birefringence, may be referred to as thermoplastic birefringent multilayer optical films.

These films have a variety of uses where the films are laminated to other film constructions (e.g. absorbing polarizers, polycarbonate or polyester sheets) and/or articles (e.g. LCD displays). At a point in each manufacturing process, there is typically a converting step where the MOF or laminated MOF is cut by any variety of processes, e.g. shear, rotary die, die press, laser, etc. The metasurface features may be formed directly onto or into the multilayer optical film. The metasurface features may be formed directly onto or into the skin layer of the multilayer optical film.

The metasurface polymeric film may be formed by any useful nano-replication technique. Nano-replication refers to a continuous thermal or photochemical process for creating a nanostructured surface layer using a cylindrical tool and a roll of polymeric support film with a thermoplastic (thermal) or UV-curable resin (photochemical) layer. One illustrative nano-replication technique is nanoimprint lithography (NIL).

Nanoimprint lithography (NIL) is a high-throughput technique for patterning of polymer nanostructures at great precision and low cost. Unlike traditional lithographic approaches which achieve pattern definition by photon or electron beam exposure of a resist layer to modify the chemical and physical properties of the resist, NIL relies on the use of a stamp in a direct mechanical deformation of the resist material. The stamp is made from a master wafer and can be re-used in a rapid process to produce many copies of the original pattern.

Optical applications for direct view electronic displays (especially display light control films for high resolution, full color displays) utilize, for example, substrate transparency, low retardance, high optical efficiency, and a low cost per unit area. The limited size of standard wafer substrates (typically utilized with NIL) and their high unit cost make them generally unsuitable for use in direct view consumer displays as light enhancement elements, diffusers, polarizers. Wafer level optics are usually relegated to micro-optical components with limited dimensions such as microlens arrays, diffraction gratings, and waveguide optics.

While display glass panels of large dimension (>1 m×1 m) are used to fabricate display backplanes, the patterning techniques and equipment (usually optical lithography steppers) have limited resolution and cannot be used to create nanostructured features. The use of polymer film substrates with engineered nanostructured surfaces enables nanopatterned parts with dimensions beyond that of semiconductor wafers, which are practically limited to 300 mm in diameter or less. Nanopatterned polymer films may have dimensions on the order of 1 m wide by 1 km long or indefinite length. The polymer films can provide the transparency across the visible and NIR spectrum required for many applications.

Optical metasurface polymeric films utilize the design of subwavelength structures or features that impart an abrupt phase shift at the interface of the subwavelength structures and the surrounding medium. Arranging these sub-wavelength structures or features on the polymeric film provides an operative phase profile of the optical metasurface film. Thus, a predetermined operative phase profile of the optical metasurface film may be modeled to determine the arrangement of these sub wavelength structures or features on the polymeric film.

Optical metasurface polymeric films are described. These optical metasurface polymeric films may be formed on flexible substrates. The flexible substrate may be large format substrates having a lateral dimension greater than 300 mm, or greater than about 400 mm, or greater than about 500 mm, for example. The flexible substrate may form a web of indefinite length. These optical metasurface polymeric films may be formed utilizing roll-to-roll processing with high fidelity.

Metasurfaces may utilize the design of subwavelength structures that can impart abrupt phase shifts at an interface. In particular, a phase gradient $(d\Phi/dx)$ along a path on the interface $(\vec{x})$ leads to the generalized Snell's law of refraction:

$$n_t \sin(\theta_t) - n_i \sin(\theta_i) = (\lambda_0/2\pi)(d\Phi/dx),$$

where $n_t$ and $n_i$ are the refractive indices experienced by the incident and transmitted light, $\theta_i$ and $\theta_t$ the angle of incidence and refraction, and $\lambda_0$ the incident wavelength in vacuum, respectively (see Yu, et al., "Flat Optics with Designer Metasurfaces" Nature Materials, Vol. 13, February 2014, pp. 139-150). Therefore, implementing such a phase discontinuity at an interface allows for the creation of anomalous refraction.

Although there are many ways of designing an element that can impart a phase discontinuity for a functional metasurface, here the Pancharatnam-Berry phase (or geometric phase) approach is utilized as an example for designing a metasurface. This allows us to use a single element with different orientation angles, which greatly reduces the number of optimization parameters. Furthermore, since the generated phase mostly depends on the rotation angle of the basic nanostructure, this approach is very robust against fabrication errors since rotation angles are typically a well-controlled parameter in fabrication compared to the structure dimensions.

To realize a Pancharatnam-Berry phase metasurface, rectangular $TiO_2$ nanofins with different widths (W), lengths (L), and heights (H) are modeled. Typically, H is constant across the entire metasurface, as this facilitates fabrication. However, this is not a necessary condition.

As light propagates through a nanofin in +z-direction, it experiences different effective refractive indices along W- and L-directions, respectively. For certain W and L sizes, the nanofin acts as a half-wave plate (HWP), i.e., linearly-polarized light propagating along one principal axis will experience a $\pi$ phase-shift relative to linearly-polarized light propagating along the other principal axis.

Therefore, the nanofin converts right-circularly polarized (RCP) light (which can be decomposed into two orthogonal linear polarization states with a relative $+\pi/2$ phase difference) to left-circularly polarized (LCP) light (which can be decomposed into two orthogonal linear polarization states with a relative $-\pi/2$ phase difference), and vice versa. If the nanofin dimensions deviate from the ideal parameters that render it a half-wave plate, circularly polarized light will only be partially converted to its opposite handedness.

To realize this metasurface a parameter sweep of TiO$_2$ nanofin dimensions may be performed in order to find structure dimensions for an efficient HWP. The sweep may be performed for different dielectric environments where the nanofin is surrounded by either air or various embedding polymers or materials. In addition to nanofins with vertical sidewalls, nanofins with varying sidewall draft angles (taper angles) may be utilized to reflect the fabrication constraints dictated by the direct replication fabrication route.

A commercially available finite-difference time-domain (FDTD) solver by Lumerical Inc. may be utilized to simulate and analyze the properties of the nanofins and determine the optimal nanofin geometries, which satisfy fabrication constraints and act as an HWP. The FDTD solver provides time-step solutions to Maxwell's equations with boundary conditions specified by the user. The results may be analyzed in the frequency-domain after Fourier transformation of the time-domain solutions.

Measurements may be performed at a wavelength of 532 nm, which is roughly in the center of the visible spectrum and facilitates subsequent measurements using a widely available green laser.

The size of the simulation mesh—the spacing between the discrete positions where Maxwell's equations are solved for each time-step—may be set to 10 nm in x, y, and z dimensions to minimize the stair-casing effect, which is introduced by the Cartesian grid used in the FDTD method. The described simulation setup may demonstrate a Pancharatnam-Berry phase TiO$_2$ nanofin metasurface operating in the visible spectrum.

In order to find optimum nanofin dimensions in different embedding materials, parameter sweeps for different nanofin dimensions and sidewall tapering angles may be performed. The nanofins are assumed to be embedded in an optical resin. Incident light may be set to be coming from the substrate side, with RCP polarization, propagating toward the nanofins. The electric and magnetic field data of the transmitted light may be collected about a wavelength away from the top of the nanofins. A far-field transform then yields the amplitude and polarization information of the transmitted light. By comparing the relative phase and amplitude of x- and y polarized light of the transmitted light in the far-field to a reference geometry, which contains only the quartz substrate without nanofins, each nanofin's RCP to LCP conversion efficiency and its transmission amplitude may be measured. For each combination of embedding materials and sidewall tapering angles, nanofin dimensions that most closely produce HWP behavior and, therefore, yield the highest conversion efficiencies for circularly polarized light may be determined.

The relative dimensions of the figures and elements illustrated may not be to scale and are show as relative equal sizing for ease or illustration. FIG. 1 to FIG. 4 and FIG. 4A are a cross-sectional schematic diagram of an illustrative optical metasurface films 100, 200, 300, 400. FIG. 5 illustrates top elevation schematic diagrams of four representative optical metasurface films. The optical metasurface film may include one or more aspects of the representative optical metasurface films illustrated in FIG. 5. The optical metasurface films illustrated in FIG. 5 are non-limiting illustrative nanostructure topography.

An optical metasurface film 100, 200, 300, 400, 500 includes metasurface feature defined by a nanostructured bilayer 106 adjacent to a light reflecting layer 102. The light reflecting layer 102 is in optical communication with the nanostructured bilayer 106. The metasurface feature may alter, enhance or improve one or more optical properties of the light reflecting layer 102.

The nanostructured bilayer 106 may have a nominal height or nominal thickness in a range from about 50 to 5000 nanometers, or from 100 to 3000 nanometers. The light reflecting layer (for example, MOF) 102 may have a thickness from 1 to 150 micrometers, or 5 to 150 micrometers, or from 20 to 100 micrometers. The optical metasurface film 100, 200, 300, 400 may thus have a thickness from 1 to 155 micrometers, or from 1 to 105 micrometers. The optical metasurface film 500 may thus have a thickness from 1 to 310 micrometers, or from 10 to 210 micrometers.

The optical metasurface film includes a flexible polymeric film 101 having a first major surface and a patterned polymer layer 104 having a first surface proximate to the first major surface of the flexible polymeric film 101 and having a second nanostructured surface opposite the first surface. A refractive index contrast layer 105 comprising a refractive index contrast material is adjacent to the nanostructured surface of the patterned polymer layer 104 forming a nanostructured bilayer 106 with a nanostructured interface 107. The nanostructured bilayer 106 includes a plurality of nanostructures disposed on the flexible polymeric film 101. The nanostructured bilayer 106 acts locally on an amplitude, phase, or polarization of light, or a combination thereof and imparts a light phase shift that varies as a function of position of the nanostructured bilayer 106 on the flexible polymeric film 101, and the light phase shift of the nanostructured bilayer 106 defines a predetermined operative phase profile of the optical metasurface film. A light reflecting layer 102 is in optical communication with the nanostructured bilayer 106.

The light reflecting layer 102 may include the flexible polymeric film 101. The flexible polymeric film 101 may separate the light reflecting layer 102 form the nanostructured bilayer 106.

The nanostructured bilayer 106 may further include an etch stop layer 103 separating the patterned polymer layer 104 from the first major surface of the flexible polymeric film 101. The etch stop layer may be an etch resistant layer that is used to define a common etch depth during a wet or dry etch process. The etch stop layer may have a thickness of greater than 2 nm and up to about 25 nm. The etch stop layer may be formed of metals and their oxides and nitrides including oxides or nitrides of Si, Al, Ti, Zr, Ta, Hf, Nb, Ce, and mixtures thereof.

The illustrative optical metasurface film 100 of FIG. 1 includes the light reflecting layer 102 separating the flexible polymeric film 101 from the nanostructured bilayer 106.

Figure 2:
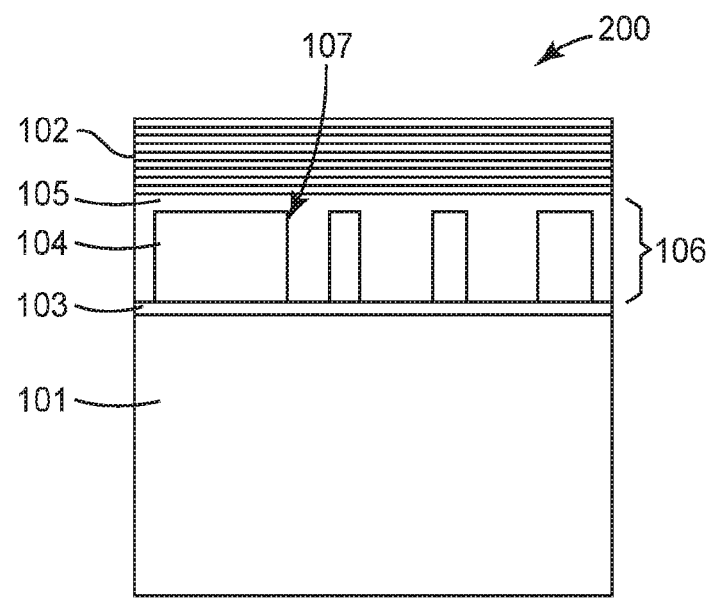
FIG. 2 is a cross-sectional schematic diagram of another illustrative optical metasurface film.

The illustrative optical metasurface film 200 of FIG. 2 includes the nanostructured bilayer 106 separating the light reflecting layer 102 from the flexible polymeric film 101.

Figure 3:
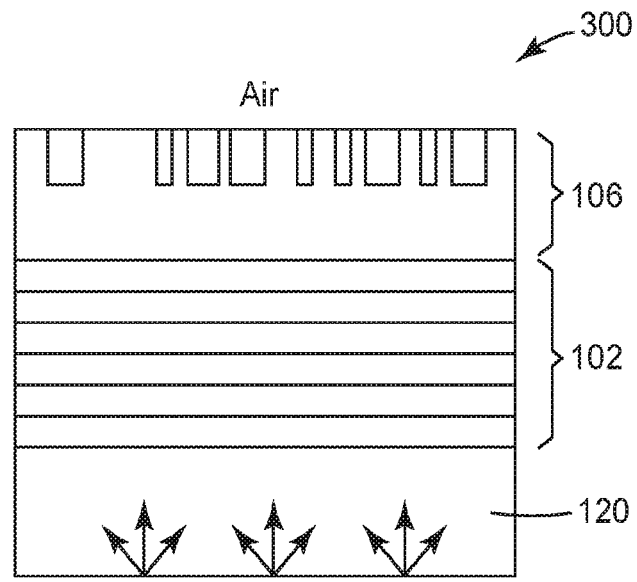
FIG. 3 is a cross-sectional schematic diagram of another illustrative optical metasurface film on a light panel.

The illustrative optical metasurface film 300 of FIG. 3 includes the light reflecting layer 102 separating the light panel 120 from the nanostructured bilayer 106.

Figure 4:
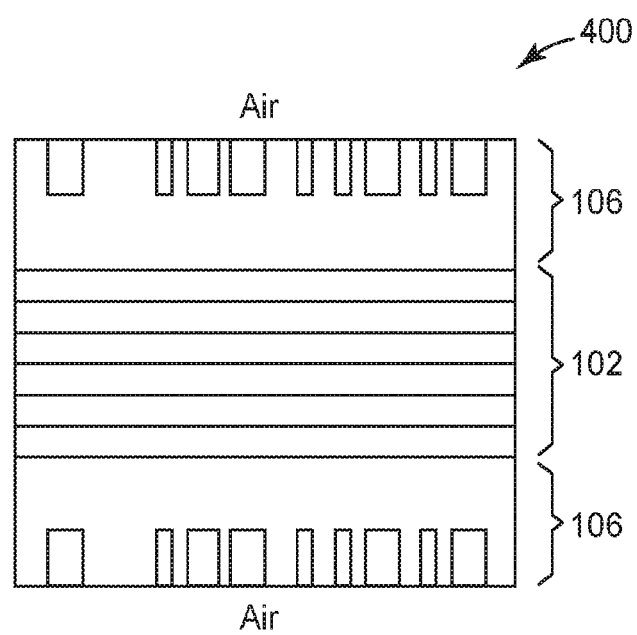
FIG. 4 is a cross-sectional schematic diagram of another illustrative optical metasurface film.
Figure 5:
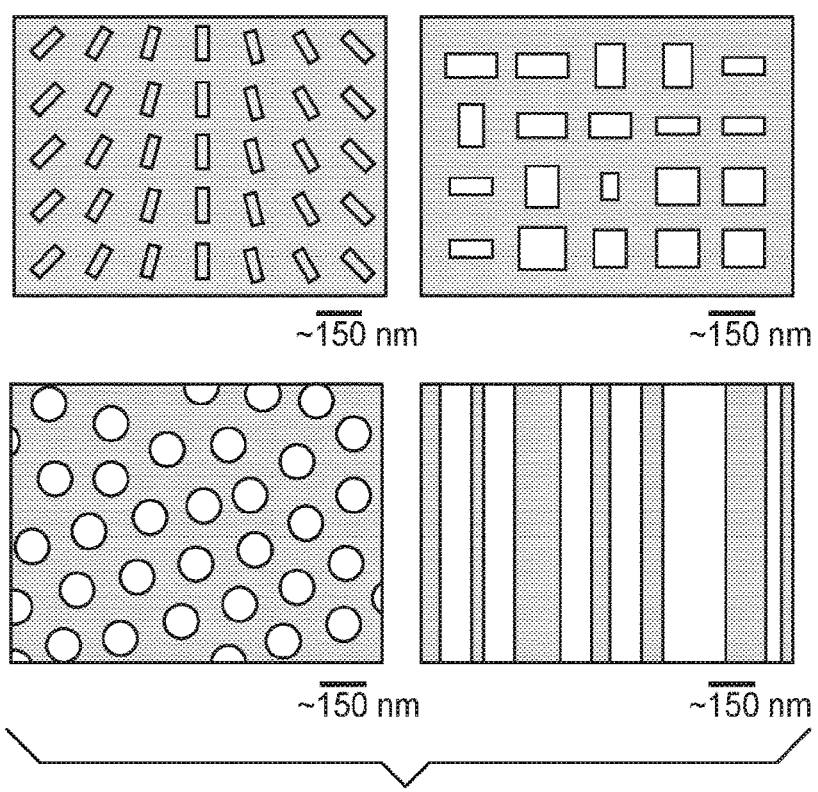
FIG. 5 illustrates top elevation schematic diagrams of four representative optical metasurface films.

The illustrative optical metasurface film 400 of FIG. 4 further includes a second nanostructured bilayer 106. The light reflecting layer 102 separates the first nanostructured bilayer 106 from the second nanostructured bilayer 106.

Figure 4A:
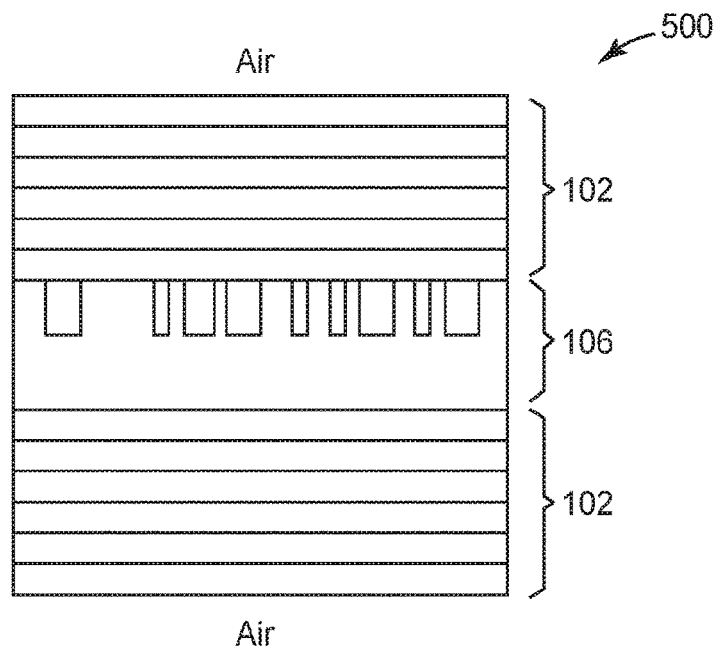
FIG. 4A is a cross-sectional schematic diagram of another illustrative optical metasurface film.

The illustrative optical metasurface film 500 of FIG. 4A further includes a second light reflecting layer 102. The nanostructured bilayer 106 separates the first light reflecting layer 102 from the second light reflecting layer 102.

Light reflected from the light reflecting layer may be altered by the nanostructured bilayer. Light transmitted through the light reflecting layer may be altered by the nanostructured bilayer.

Light reflected and altered by the nanostructured bilayer may be in a wavelength range from about 380 to about 1600 nm. Light reflected and altered by the nanostructured bilayer may be in a wavelength range from about 380 to about 750 nm. Light reflected and altered by the nanostructured bilayer may be in a wavelength range from about 750 to about 1600 nm. Light reflected and altered by the nanostructured bilayer may be in a wavelength range from about 1600 to about 3000 nm. Light reflected and altered by the nanostructured bilayer may be in a wavelength range from about 3000 to about 8000 nm. Light reflected and altered by the nanostructured bilayer may be in a wavelength range from about 8000 to 15000 nm. Light reflected and altered by the nanostructured bilayer may be in a wavelength range from about 15 to 1000 micrometers.

Light transmitted and altered by the nanostructured bilayer may be in a wavelength range from about 380 to about 1600 nm. Light transmitted and altered by the nanostructured bilayer may be in a wavelength range from about 750 to about 1600 nm. Light transmitted and altered by the nanostructured bilayer may be in a wavelength range from about 1600 to about 3000 nm. Light transmitted and altered by the nanostructured bilayer may be in a wavelength range from about 3000 to about 8000 nm. Light transmitted and altered by the nanostructured bilayer may be in a wavelength range from about 8000 to 15000 nm. Light transmitted and altered by the nanostructured bilayer may be in a wavelength range from about 15 to 1000 micrometers.

The light reflecting layer may operate as a mirror element. The light reflecting layer may operate as a polarizer element. The light reflecting layer may operate as a reflective polarizer element.

The light reflecting layer may include a multilayer optical film. The light reflecting layer may include polymeric multilayer optical film. The polymeric multilayer optical film may operate as a mirror element. The polymeric multilayer optical film may operate as a polarizer element. The polymeric multilayer optical film may operate as a reflective polarizer element. The polymeric multilayer optical film may operate as a spectral filter.

The nanostructured bilayer may act locally on the amplitude of light. The nanostructured bilayer may act locally on the phase of light. The nanostructured bilayer may act locally on the polarization of light. The nanostructured bilayer may act locally on both the amplitude of light and the phase of light. The nanostructured bilayer may act locally on both the amplitude of light and the polarization of light. The nanostructured bilayer may act locally on both the phase of light and the polarization of light.

The flexible polymeric film may be formed of a thermoplastic material. The flexible polymeric film may be formed of polyester, co-polyester, polycarbonate, polyurethane, poly(methyl methacrylate), polystyrene, polyimide, polyethylene napthalate, polyproplyene, polycyclo-olefins, preferred polyester and polycarbonate. The flexible polymeric film may have a uniform thickness. The flexible polymeric film may have a nominal thickness in a range from about 5 micrometers to about 300 micrometers. The flexible polymeric film may have a uniform thickness in a range from 10 micrometers to 250 micrometers, or from 25 micrometers to 125 micrometers. The flexible film may exhibit optical retardance.

The nanostructured bilayer may be defined by solid materials. The nanostructured bilayer may be formed of solid materials. The nanostructured bilayer may be formed of polymeric materials.

The patterned polymer layer may be formed of thermoplastic material. The patterned polymer layer may be formed of poly(methyl methacrylate), polycarbonate, polypropylene, polyethylene, polystyrene, polyester, polyamide. The patterned polymer layer may be formed of polymerizable compositions comprising acrylate or methacrylate components. The patterned polymer layer may include a fluoropolymer, (meth)acrylate (co)polymer, or silica containing polymers.

The refractive index contrast material may have a first refractive index value and the patterned polymer layer has a second refractive index value being at least 0.25 different than, or 0.5 different than, or 0.75 different than, or 1.0 different than, or 1.4 different than the first refractive index value.

The refractive index contrast material may have a first refractive index value in a range from 1.7 to 2.5. The patterned polymer layer has a second refractive index value in a range from 1.2 to 1.7.

The refractive index contrast material may include a metal oxide or metal nitride. The refractive index contrast material may include at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

The patterned polymer layer may include fluoroacrylate and the refractive index contrast material may include titanium dioxide. The patterned polymer layer may include (meth)acrylate and the refractive index contrast material may include titanium dioxide.

The nanostructured bilayer may be defined by a plurality of nanostructures embedded into the refractive index contrast layer. The nanostructures forming the nanostructured surface may have an aspect ratio of at least about 1:1, 2:1, 5:1, 10:1 or 15:1. The nanostructures forming the nanostructured surface preferably may have an aspect ratio in a range of about 2:1 to about 20:1, or from about 4:1 to about 15:1.

The nanostructures forming the nanostructured surface may define a tapered sidewall having an angle in a range from about 1 to 10 degrees, 2 to 10 degrees, 3 to 10 degrees, 4 to 10 degrees, 1 to 6 degrees, 2 to 6 degrees, or 3 to 6 degrees, or 2 to 4 degrees. The nanostructures forming the nanostructured surface may define a tapered sidewall having an angle in a range from about 0 to 10 degrees, 0 to 6 degrees, 0 to 3 degrees, 0 to 2 degrees, 0 to 1 degree, or 0 degrees.

The nanostructures forming the nanostructured surface may have a height of 5 micrometer or less, or in a range from about 50 to about 5000 nanometres, or 100 nanometers to about 3000 nanometers, or from about 500 nanometers to about 1500 nanometers.

The nanostructures forming the nanostructured surface has a nominal pitch (center-to-center distance between adjacent nanostructures) that is subwavelength with respect to the shortest wavelength contained in the interrogating electromagnetic radiation.

For optical metasurfaces operating in the visible spectral range, the nanostructures forming the nanostructured surface may have a nominal pitch (center to center) of 600 nanometers or less, or 500 nanometers or less, or 400 nanometers or less. For optical metasurfaces operating in the visible spectral range, the nanostructures forming the nanostructured surface may preferably have a nominal pitch of 50 nanometers to 600 nanometers, or 100 nanometers to 500 nanometers, or 200 nanometers to 400 nanometers.

For optical metasurfaces operating in the IR spectral range, the nanostructures forming the nanostructured surface may have a nominal pitch (center to center) of 1200 nanometers or less, or 1000 nanometers or less, or 800 nanometers or less. For optical metasurfaces operating in the IR spectral range, the nanostructures forming the nanostructured surface may preferably have a nominal pitch of 100 nanometers to 1200 nanometers, or 200 nanometers to 1000 nanometers, or 400 nanometers to 800 nanometers.

The nanostructures forming the nanostructured surface are each separated from each other (edge to edge) by a subwavelength lateral distance. The nanostructures forming the nanostructured surface are each separated from each other by about 400 nanometers or less, or in a range from about 20 nanometers to about 400 nanometers, or from about 50 nanometers to about 300 nanometers.

The nanostructures forming the nanostructured surface have a lateral dimension orthogonal to a nanostructure feature height that is subwavelength. The nanostructures forming the nanostructured surface may have a lateral dimension orthogonal to a nanostructure feature height of about 600 nanometers or less, or in a range from about 10 nanometers to about 400 nanometers, or from about 50 nanometers to about 350 nanometers.

The light phase shift may occur in a visible light wavelength range. The light phase shift may occur in a near IR wavelength range. The optical metasurface film may transmit visible or near infrared light.

The nanostructures forming the nanostructured surface may have a varying orientation that depends on the location of the individual nanostructure on the flexible polymeric film. The nanostructures forming the nanostructured surface may have a varying spatial arrangement that depends on the location of the individual nanostructure on the flexible polymeric film. The nanostructures forming the nanostructured surface may have a varying shape that depends on the location of the individual nanostructure on the flexible polymeric film. The nanostructures forming the nanostructured surface may have a varying aspect ratio that depends on the location of the individual nanostructure on the flexible polymeric film.

The nanostructures forming the nanostructured surface may be geometrically anisotropic in a planar direction. The nanostructures forming the nanostructured surface may be geometrically isotropic in a planar direction.

Figure 6:
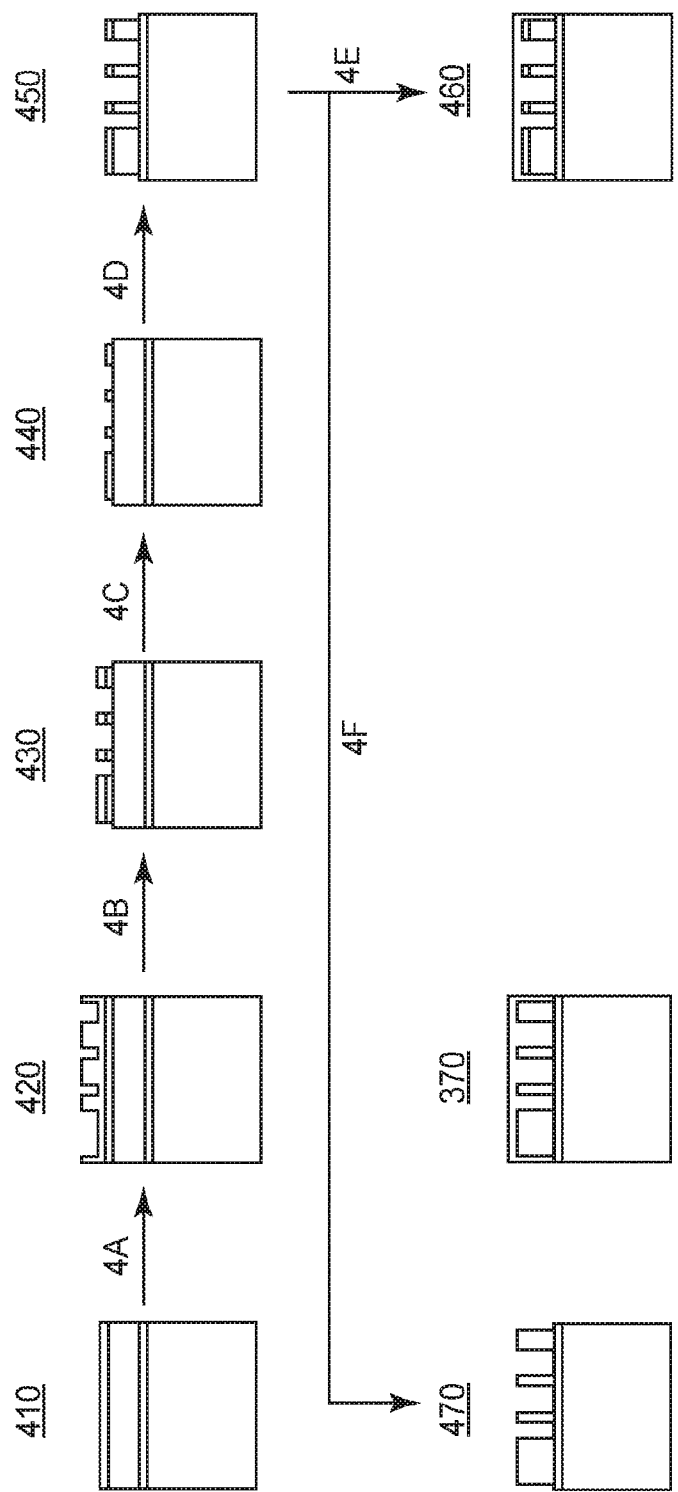
FIG. 6 illustrates a cross-sectional schematic diagram of an illustrative method of forming an illustrative optical metasurface film.

FIG. 6 illustrates a cross-sectional schematic diagram of an illustrative method of forming an illustrative optical metasurface film.

This fabrication route utilizes a hard mask layer that also functions as a second etch stop layer. The inclusion of a hard mask layer has four beneficial effects. First, it reduces or eliminates the requirement for a near zero land resist replication process since the etch of the thin hard mask layer does not require a high aspect ratio resist feature. Second, the nanoreplicated resist material can be an acrylate resin formulation rather than a silicon-rich hybrid material. Third, the hard mask etch process enables the formation of deep vias with vertical sidewalls (important for optical metasurface applications). Finally, the construction allows for the use of a low refractive index pattern transfer layer (e.g., a fluoroacrylate) since the vapor deposition step for the hard mask layer forms a well-adhered layer inorganic layer with good wettability for the nanoreplicated resin layer.

It utilizes an input roll for the nanoreplication process comprising a polymeric support film, and an etch stop layer, a precision pattern transfer layer, and a hard mask layer. It requires a process such as roll-to-roll nanoimprint lithography (R2R NIL) to form a near zero land structured etch resist layer in the first process step, but the land control can be relaxed. Since the construction is etched through the entire pattern transfer layer thickness, the layer thickness ultimately defines the feature height in the final article. The process is useful if both the feature height uniformity and the absolute feature height of the surface features in the final article is critical (e.g., for optical metasurface applications) and embedded optical elements with a low refractive index organic layer and a higher refractive index metal oxide backfill layer.

The material used for the pattern transfer layer may be utilized as either the low or high refractive index material in the embedded optical element.

A film comprising a polymeric support film, an etch stop layer, a precision pattern transfer layer, and a hard mask layer 410 is utilized as the input roll for a R2R NIL or continuous cast and cure (process 4A, "R2R NIL"). Nanoreplicated film 420 is etched in a reactive ion etch (RIE) process until the top surface of the hard mask layer has been exposed (process 4B, "breakthrough etch") to produce intermediate 430. Some resin residue may remain after this step and can be removed in an optional additional RIE step (process 4C). Hard mask patterned intermediate 440 is further etched in a second RIE process using a second etch chemistry until the pattern transfer layer is etched through to the etch stop layer (process 4D). Etched nanopatterned film with hard mask residue 450 can be either planarized with a high refractive index backfill to form embedded nanopatterned optical film 460 (process 4E) or subjected to different etch conditions to remove the hard mask residue to form unfilled nanopatterned optical film 470 (process 4F). Finally, unfilled nanopatterned optical film 470 can be planarized with a high refractive index backfill to form embedded nanopatterned optical film 370.

Light filtering based on its polarization state, (a polarizer), is widely used in many optical devices such as LCDs. Meanwhile, angular selection of light has also been achieved such as using micro-louvers to enable high on-axis transmission and low off-axis transmission for privacy applications. However, combining both polarization and angle selectivity in a compact planar film is desired.

Figure 7A:
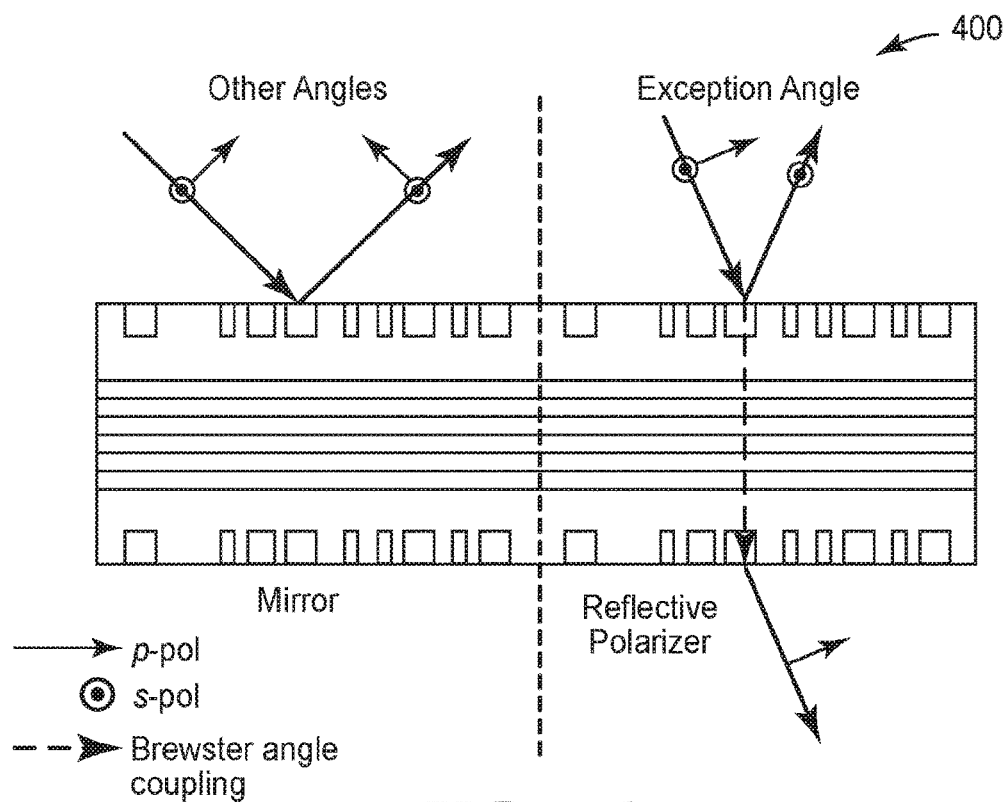
FIGS. 7A and 7B are cross-sectional schematic diagrams of the illustrative optical metasurface film construction of FIG. 4 illustrating reflection and polarizer modes of operation.
Figure 7B:
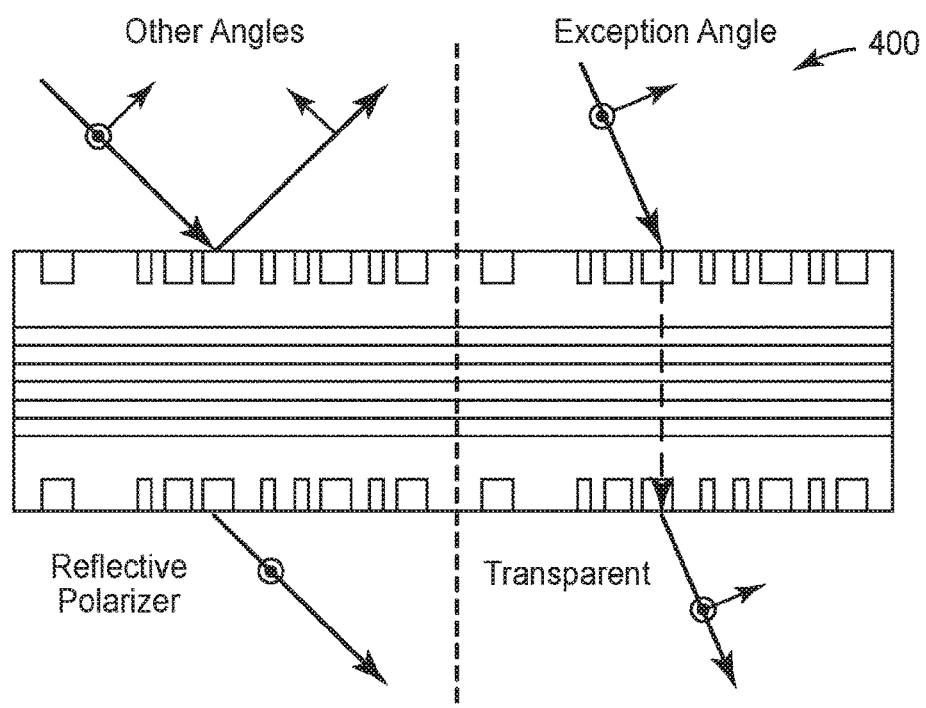

FIGS. 7A and 7B are cross-sectional schematic diagrams of the illustrative optical metasurface film construction of FIG. 4 illustrating reflection and polarizer modes of operation.

FIG. 7A and FIG. 7B is a design of an optical film that enables light filtering based on its polarization state and propagation angle simultaneously. The physical principle of the film relies on (1) the Brewster angle ($\theta_B$) of light in a multilayer optical film (MOF) and (2) a planar optical metasurface that couples light from a low index environment, for example air, into the Brewster angle. The need for the metasurface is because, for most dielectric materials, the Brewster angle is beyond the critical angle for total internal reflection ($\theta_B > \theta_{cr}$) so that it is not accessible from the air and requires an index-matched environment (see Shen, Y., et al., *Optical Broadband Angular Selectivity*. Science, 343(6178), 1499-1501, U.S. Pat. No. 10,073,191). In comparison, the film of FIG. 4 can operate in the air on both sides (with two metasurfaces, one on each side) or laminate to a light-emitting panel on one side (with one metasurface on the air-facing side, FIG. 3). The ability to take advantage of the Brewster angle effect in the air significantly broadens the practicality of the proposed approach.

When operating in air, the proposed film can achieve angle and polarization selectivity in two modes. First, as shown in FIG. 7A, the film reflects both s- and p-polarized light at all incidence angles (like a mirror) except for one exception angle ($\theta_e$), where the p-polarized light is coupled into the Brewster angle of the MOF by the metasurface. At this special angle, p-polarized light can be transmitted at nearly 100% while s-polarized light is reflected. Therefore, the film behaves like a polarizer at $\theta_e$. The second mode of operation is shown in FIG. 7B. Unlike the first case, in this mode, the film behaves as a typical reflective polarizer where s-polarized light is transmitted, and p-polarized light is reflected at all angles except for the exception angle $\theta_e$. At $\theta_e$, both s-polarized and p-polarized light will be transmitted, and the film behaves like a transparent material.

Figure 8A:
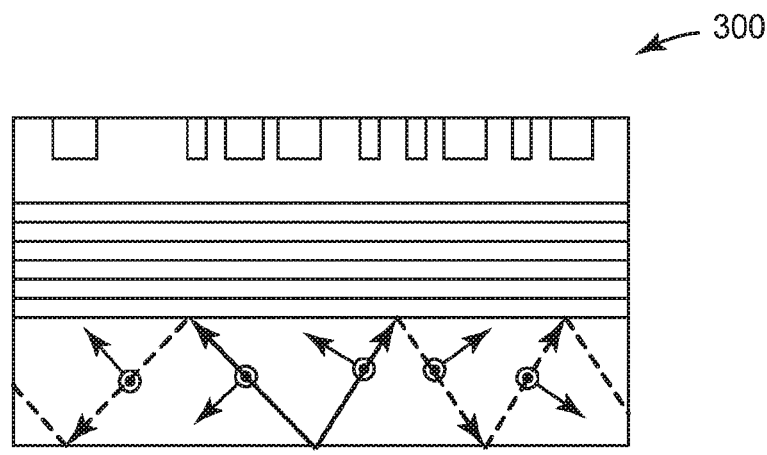
FIGS. 8A and 8B are cross-sectional schematic diagrams of the illustrative optical metasurface film construction of FIG. 3 illustrating polarizer and collimating modes of operation.
Figure 8B:
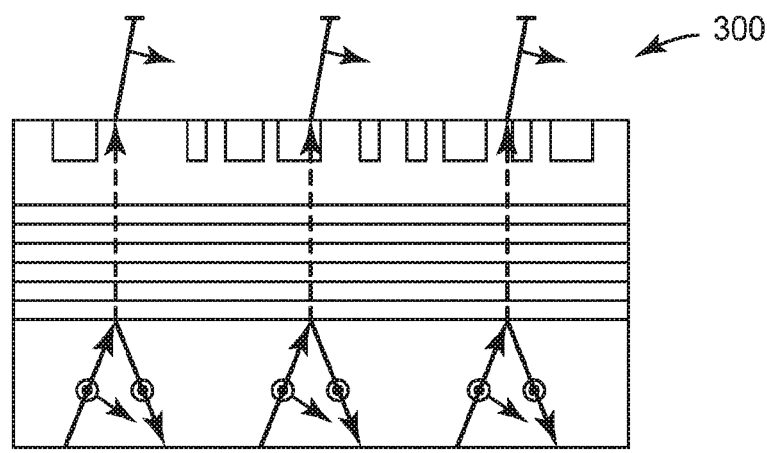

The third operating mode of the film is when it is laminated to a light-emitting panel (FIGS. 8A and 8B). In this configuration, the film can achieve both polarization recycling (like typical reflective polarizers) and light collimation. Except at the Brewster angle $\theta_B$, the light of both s- and p-polarization is reflected by the MOF towards the panel to achieve recycling due to the cavity effect. At $\theta_B$, p-polarized light will be transmitted through the MOF and then coupled to the exception angle $\theta_e$ into the air by the metasurface. In this way, we have created an efficient polarized and collimated light source from a general non-polarized Lambertian light source.

The final point to emphasize here is the ability to change the value of exception angle $\theta_e$ at will by tweaking the design of the metasurface and the MOF. A large angular range, from near normal to glancing incidence, can be covered by a family of metasurface and MOF designs. In this way, we can create a flexible platform to suit different applications.

The invention is defined in the claims. However, below there is provided a non-exhaustive listing of non-limiting embodiments. Any one or more of the features of these embodiments may be combined with any one or more features of another embodiment, example, or aspect described herein.

Embodiment 1. An optical metasurface film, comprising: a flexible polymeric film having a first major surface; a patterned polymer layer having a first surface proximate to the first major surface of the flexible polymeric film and having a second nanostructured surface opposite the first surface; a refractive index contrast layer comprising a refractive index contrast material adjacent to the nanostructured surface of the patterned polymer layer forming a nanostructured bilayer with a nanostructured interface, the nanostructured bilayer comprising a plurality of nanostructures disposed on the flexible polymeric film, wherein the nanostructured bilayer acts locally on an amplitude, phase, or polarization of light, or a combination thereof and imparts a light phase shift that varies as a function of position of the nanostructured bilayer on the flexible polymeric film, and the light phase shift of the nanostructured bilayer defines a predetermined operative phase profile of the optical metasurface film; and a light reflecting layer in optical communication with the nanostructured bilayer.

Embodiment 2. The optical metasurface film according to embodiment 1, wherein the light reflecting layer separates the flexible polymeric film from the nanostructured bilayer.

Embodiment 3. The optical metasurface film according to embodiment 1, wherein the nanostructured bilayer separates the light reflecting layer from the flexible polymeric film.

Embodiment 4. The optical metasurface film according to embodiment 1, further comprising a second light reflecting layer, wherein the nanostructured bilayer separates the light reflecting layer from the second light reflecting layer Embodiment 5. The optical metasurface film according to embodiment 1, further comprising a second nanostructured bilayer, wherein the light reflecting layer separates the nanostructured bilayer from the second nanostructured bilayer.

Embodiment 6. The optical metasurface film according to any preceding embodiment, wherein light reflected from the light reflecting layer is altered by the nanostructured bilayer.

Embodiment 7. The optical metasurface film according to any preceding embodiment, wherein light transmitted through the light reflecting layer is altered by the nanostructured bilayer.

Embodiment 8. The optical metasurface film according to embodiment 6, wherein the light reflected has a wavelength value in a range from 380 to 1600 nm, or from 280 to 750 nm, or from 750 to 1600 nm.

Embodiment 9. The optical metasurface film according to embodiment 7, wherein the light transmitted has a wavelength value in a range from 380 to 1600 nm, or from 280 to 750 nm, or from 750 to 1600 nm.

Embodiment 10. The optical metasurface film according to any preceding embodiment, wherein the light reflecting layer comprises multilayer optical film.

Embodiment 11. The optical metasurface film according to any preceding embodiment, wherein the light reflecting layer comprises polymeric multilayer optical film.

Embodiment 12. The optical metasurface film according to any preceding embodiment, wherein the light reflecting layer comprises a polarizer.

Embodiment 13. The optical metasurface film according to any preceding embodiment, wherein the nanostructured bilayer is defined by solid materials.

Embodiment 14. The optical metasurface film according to any preceding embodiment, wherein the refractive index contrast material has a first refractive index value and the patterned polymer layer has a second refractive index value being at least 0.25 different than, or 0.5 different than, or 0.75 different than, or 1.0 different than, or 1.4 different than the first refractive index value.

Embodiment 15. The optical metasurface film according to any preceding embodiment, wherein the nanostructured bilayer is defined by a plurality of nanostructures embedded into the refractive index contrast layer.

Embodiment 16. The optical metasurface film according to any preceding embodiment, wherein the refractive index contrast material comprises a metal oxide or metal nitride.

Embodiment 17. The optical metasurface film according to any preceding embodiment, wherein the refractive index contrast material comprises at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

Embodiment 18. The optical metasurface film according to any preceding embodiment, wherein the patterned polymer layer comprises a fluoropolymer, (meth)acrylate (co) polymer, or silica containing polymers.

Embodiment 19. The optical metasurface film according to any preceding embodiment, wherein the patterned polymer layer comprises fluoroacrylate and the refractive index contrast material comprises titanium dioxide.

Embodiment 20. The optical metasurface film according to any preceding embodiment, wherein the patterned polymer layer comprises (meth)acrylate and the refractive index contrast material comprises titanium dioxide.

Embodiment 21. The optical metasurface film according to any preceding embodiment, wherein nanostructures forming the nanostructured surface has an aspect ratio of at least about 1:1, 2:1, 5:1, 10:1 or 15:1.

Embodiment 22. The optical metasurface film according to any preceding embodiment, wherein nanostructures forming the nanostructured surface defines a tapered sidewall having an angle in a range from about 1 to 10 degrees, 2 to 10 degrees, 3 to 10 degrees, 4 to 10 degrees, 1 to 6 degrees, 2 to 6 degrees, or 3 to 6 degrees.

Embodiment 23. The optical metasurface film according to any preceding embodiment, wherein nanostructures forming the nanostructured surface defines a tapered sidewall having an angle in a range from about 0 to 10 degrees, 0 to 6 degrees, 0 to 3 degrees, 0 to 2 degrees, 0 to 1 degree, or 0 degrees.

Embodiment 24. The optical metasurface film according to any preceding embodiment, wherein the flexible polymeric film has a nominal thickness in a range from about 5 micrometers to about 300 micrometers.

Embodiment 25. The optical metasurface film according to any preceding embodiment, wherein nanostructures forming the nanostructured surface has a height of 5 micrometer or less, or in a range from about 100 nanometers to about 3000 nanometers, or from about 500 nanometers to about 1500 nanometers.

Embodiment 26. The optical metasurface film according to any preceding embodiment, wherein nanostructures forming the nanostructured surface has a nominal pitch of 600 nanometers or less, or 500 nanometers or less, or 400 nanometers or less.

Embodiment 27. The optical metasurface film according to any preceding embodiment, wherein nanostructures forming the nanostructured surface are each separated from each other by about 400 nanometers or less, or in a range from about 20 nanometers to about 400 nanometers, or from about 50 nanometers to about 300 nanometers.

Embodiment 28. The optical metasurface film according to any preceding embodiment, wherein nanostructures forming the nanostructured surface have a lateral dimension orthogonal to a nanostructure feature height of about 600 nanometers or less, or in a range from about 10 nanometers to about 400 nanometers, or from about 50 nanometers to about 350 nanometers.

Embodiment 29. The optical metasurface film according to any preceding embodiment, wherein the light phase shift occurs in a visible light wavelength range.

Embodiment 30. The optical metasurface film according to any preceding embodiment, wherein the light phase shift occurs in a near IR wavelength range.

Embodiment 31. The optical metasurface film according to any preceding embodiment, wherein nanostructures forming the nanostructured surface has a varying orientation that depends on the location of the individual nanostructure on the flexible polymeric film.

Embodiment 32. The optical metasurface film according to any preceding embodiment, wherein nanostructures forming the nanostructured surface has a varying spatial arrangement that depends on the location of the individual nanostructure on the flexible polymeric film.

Embodiment 33. The optical metasurface film according to any preceding embodiment, wherein nanostructures forming the nanostructured surface has a varying shape that depends on the location of the individual nanostructure on the flexible polymeric film.

Embodiment 34. The optical metasurface film according to any preceding embodiment, wherein nanostructures forming the nanostructured surface has a varying aspect ratio that depends on the location of the individual nanostructure on the flexible polymeric film.

Embodiment 35. The optical metasurface film according to any preceding embodiment, wherein the optical metasurface film transmits visible or near infrared light.

Embodiment 36. The optical metasurface film according to any preceding embodiment, wherein nanostructures forming the nanostructured surface are geometrically anisotropic in a planar direction.

Embodiment 37. The optical metasurface film according to any preceding embodiment, wherein nanostructures forming the nanostructured surface are geometrically isotropic in a planar direction.

Embodiment 38. The optical metasurface film according to any preceding embodiment, wherein the optical metasurface film has at least one lateral dimension that is greater than about 300 mm, or greater than about 400 mm, or greater than about 500 mm.

Embodiment 39. The optical metasurface film according to any preceding embodiment, wherein the light reflecting layer comprises a multilayer optical film having less than 20 layers, wherein a refractive contrast between a high index layer and a low index layer is not less than 1.

Embodiment 40. The optical metasurface film according to embodiment 39, wherein the light reflecting layer has a nominal thickness in a range from 0.5 to 2 micrometers.

Embodiment 41. The optical metasurface film according to any preceding embodiment, wherein the light reflecting layer comprises a polymeric multilayer optical film having 20 to 1000 layers, wherein a refractive contrast between a high index layer and a low index layer is not less than 0.1, or not less than 0.01.

Embodiment 42. The optical metasurface film according to embodiment 41, wherein the light reflecting layer has a nominal thickness in a range from 5 to 100 micrometers.

Embodiment 43. The optical metasurface film according to any preceding embodiment, wherein the light reflecting layer acts as a polarization and angle selective filter such that only light with a certain polarization state and propagation angle is transmitted and interacts with the nano structured bilayer.

Embodiment 44. The optical metasurface film according to any preceding embodiment, wherein the light reflecting layer comprises a metal layer having a nominal thickness in a range from 10 to 1000 nanometers, or from 10 to 500 nanometers, or from 10 to 100 nanometers.

EXAMPLES

Materials

| Description | Component | Source |
| --- | --- | --- |
| Urethane acrylate oligomer | PHOTOMER 6010 | BASF, Florham Park, NJ |
| Ethoxylated (4) bisphenol A diacrylate | SR601 | Sartomer Americas, Exton, PA |
| Ethoxylated (10) bisphenol A diacrylate | SR602 | Sartomer Americas, Exton, PA |

| Description | Component | Source |
|---|---|---|
| Trimethylopropane triacrylate | SR351 | Sartomer Americas, Exton, PA |
| 2-Phenoxyethyl acrylate | ETERMER 210 | Toagosei America Inc., West Jefferson, OH |
| Diphenyl(2,4,6-trimethylbenzoyl)phosphine oxide | IRGACURE TPO | BASF, Florham Park, NJ |
| 2-Hydroxy-2-methyl-l-phenyl-propanone | DAROCUR 1173 | BASF, Florham Park, NJ |
| 2-Propenoic Acid, 2-(4-benzoylphenoxy) ethyl ester (disclosed in U.S. Pat. No. 4,847,137 - Example B para-acryloxyethoxybenzophenone (EABP)) | AEBP | |
| Solvent | Methanol | Sigma-Aldrich, Milwaukee, WI |
| Solvent | methyl ethyl ketone | Sigma-Aldrich, Milwaukee, WI |
| Nitrogen trifluoride | NF3 | Dupont de Nemours, Wilmington, Delaware |
| Titanium Tetraisopropoxide | TTIP | Strem Chemicals, Inc. Newburyport, Massachusets |
| Hexamethyldisiloxane - PRODUCT CODE: SIH6115.0; CAS NO: 107-46-0 | HMDSO | Gelest, Inc. 11 East Steel Road, Morrisville, PA 19067 |
| Propylene glycol methyl ether | Dowanol PM | The Dow Chemical Company, Mmidland MI |
| Photomer 6010, SR602, SR601, SR351, and Eterner 210 were combined in a weight ratio of 60/20/4/8/8 to produce a curable resin. Irgacure TPO and Darocur 1173 were added in respective weight ratios of 0.35 and 0.1 parts per 100 parts of resin. (from U.S. Pat. No. 9,910,192 Example 4) | Compound 01 | |
| A polymerizable resin made by mixing 0.5% (2,4,6 trimethyl benzoyl) diphenyl phosphine oxide into a 75:25 blend of PHOTOMER 6210 and SR238. Disclosed in US2013/0211310 A1 | Compound 02 | |
| Prepared according to Preparation No. 6., U.S. Pat. No. 7,718,264B2 column 25 lines 35-56 with the same starting materials in the same molar ratios, by a similar method, substituting acetone at 65% solids for methyl ethyl ketone at 50% solids | Compound 05 | |
| 2-(3-trimethoxysilylpropylcarbamoyloxy)ethyl prop-2-enoate example 7 of U.S. Pat. No. 9,790,396 | Compound 06 | |
| Polycarbonate film | 125 micron thick polycarbonate film with a gloss surface finish on both sides obtained from | Tekra, Inc., New Berlin, WI |

All Concentrations are Weight Percent

Example 1. Functional Metasurface Made by Four-Layer Method with Low-Residual Transfer on MOF All Concentrations are Percent by Weight Step a: Replication of Nano-Featured Template Film Compound 01 was blended with 0.5% AEBP to form a mixture. The mixture was blended at approximately 50 degrees C. for 12 hours on a roller mixer. This mixture was fed through a peristaltic pump into a die and onto a 125 micrometer polycarbonate film. The resin coated film was nipped against a round nickel sleeve controlled at 60 degrees C. which had a nano-scale pattern welded into it. Features ranged from 100 nm-350 nm on a side and were 200 nm tall. Nominally zero vertically draft. While in contact with the nickel sleeve, the resin coated film is exposed to radiation from two Fusion lamps operating at 142 W/cm. The nano-structured film was then peeled from the round nickel sleeve. The process is run continuously at 7.5 m/min for over 300 m.

Step b: Release Treatment of Nano-Featured Template Film

Tooling film from step (a) was release treated using PECVD. First the film was primed by flowing $O_2$ into the chamber at 14.2 $m^3$/min at 2000 W plasma power at 9 m/min. The film was then treated with HMDSO at 1000 Watts at 9 m/min.

Step c: Coat Acrylate onto Template Film

The release treated tooling film (b) was die coated with a solution of 13% Compound 2, 1% Compound 05, 43% MEK and 43% Dowanol PM at 3 m/min. The coating is pre-cured with a UV-LED system run at 0.2 A within 30 seconds of coating. A very thin residual layer was desired, so that the residual layer thickness can be controlled to be between zero and 500 nm with jig precision using a premetered coating method. This coating method uses a solution which is at least 50% solvent.

Step d: Drying Acrylate onto Tooling Film

The solvent was allowed to evaporate off of the film (c) in a 12 m free-span. To prevent disturbing the wet film, no heat or convection was used to dry off the solvent.

Step e: Creation of Three-Layer Film (to be Laminated onto the Acrylate Coated Template Film)

As this film is part of the final construction, a film consisting of multiple layers is chosen, due to its optical "reflective" properties. This film is formed according to the following procedure.

Roll to roll coating of the multilayer optical thin film stack is done by AC sputtering processes, wherein alternating layers of high refractive index (~n 4.0) and low refractive index (~n 1.5) materials, each precisely controlled to a pre-determined thickness target, are deposited onto the moving film substrate. In-situ optical spectrometers are used during processing to monitor the layer by layer deposition sequence.

In this application an optical design with ten layers is used, and is depicted in the following table:

|  | Layer # | Thickness (nm) | n |
|---|---|---|---|
| Outer layer → | 1 | 105.00 | 1.5 |
|  | 2 | 41.38 | 4 |
|  | 3 | 115.67 | 1.5 |
|  | 4 | 45.38 | 4 |
|  | 5 | 126.33 | 1.5 |
|  | 6 | 49.38 | 4 |
|  | 7 | 137.00 | 1.5 |
|  | 8 | 53.38 | 4 |
|  | 9 | 147.67 | 1.5 |
|  | 10 | 57.38 | 4 |
| Substrate → | — | — | 1.5 |

For the high refractive index material, silicon, which has refractive index near 4.0 and low absorptance in the visible wavelength region, is preferred. For the low refractive index material, silicon dioxide ($SiO_2$), which has refractive index near 1.5 and low absorptance in the visible wavelength range, is preferred. Also, for higher processing rates and precision process control, midfrequency (20-70 kHz) AC sputtering method is used for each.

Depending upon the layout of the roll to roll vacuum coater and, particularly, the number of sputtering sources available, the coating sequence may vary. In this example the coater has four sputtering target pairs, in the sequence [1-2=silicon, 3-4=$SiO_2$, 5-6=silicon 7-8=$SiO_2$], each powered by AC sputtering technique. This allows sputtering of insulating materials without electrically charging the sputtering sources surfaces. Also, "speed matching" the process rates for the two materials allows, in this machine layout example, the coating of layers 1-4 in machine pass 1, layers 5-7 in machine pass 2 and layers 8-10 in machine pass 3.

To start, the film roll is installed into the coating chamber and threaded though the film (web) path, after which the chamber is vacuum pumped from atmospheric pressure to high vacuum pressure region, generally $\leq/=10^{-5}$ Torr. Argon is used as the primary sputtering gas and is flow-controlled into the sputtering apparatus to create a steady-state pressure in the 3 mTorr pressure region. Film movement is initiated and sputtering power is applied to sputtering target pair 1,2 at AC frequency of 40 kHz, then slowly increased to a pre-determined power density ($W/cm^2$), one which is sufficient to produce a usable sputtering rate without inducing thermal stress to the silicon sputtering sources or cause excessive sputtering plasma heating of the film being coated. After a pre-determined pre-sputtering period and attainment of steady-state conditions, the film speed is adjusted in order to precisely coat the layer 1 (silicon) targeted thickness, in this example 57.38 nm.

Sequentially, a similar process sequence is used to start the sputter source pair (3,4) for layer 2, $SiO_2$, with one additional aspect: following argon flow-control to sputtering pressure, and initiation and establishment of steady-state sputtering power, oxygen is flow-controlled to add an added "partial pressure" and AC power is adjusted to a pre-determined setting, one where the interaction of AC power, reactive+primary sputtering gas pressure and deposition time (film speed), produce the transparent $SiO_2$ layer at the desired thickness, in this example 147.67 nm.

As with sputtering target pairs 1,2 for silicon (layer 1), and 3,4 for $SiO_2$ (layer 2), sputtering target pairs 5,6 for silicon (layer 3) and 7,8 for $SiO_2$ (layer 4), are similarly started and taken to steady-state processing condition. This allows layers 1-4 to be coated in machine pass 1.

Though sputtering conditions (sputtering power, main and reactive gas pressures, and film process speed (feet per minute, or sputtering time) are pre-determined, additional process control precision is applied with the use of in-line optical spectrometers. These are located after each sputtering pair and measure both spectral transmittance & reflectance, with conversion to temporal values for color coordinates $L^*$, $a^*$ and $b^*$. According to optical design, minimum-maximum values for "in specification" color coordinate values are, layer by layer, pre-established and, much like with Manufacturing Process Control Charts, adjustments to sputtering conditions can be made in order to maintain the total process within control limits.

Upon the completion of machine pass 1 and layers 1-4, the film roll is reversed for machine pass 2 and layers 5-7. Here, though, AC sputter pair 7,8 ($SiO_2$), is turned off, allowing layer 5 (sputtering target pair 5,6-silicon) to next be coated, followed by layers 6 (sputtering target pair 3,4—$SiO_2$) and 7 (sputtering target pair 1,2—silicon). As with machine pass 1, in-line optical spectrometry is used to maintain process control limits.

Upon the completion of machine pass 2 and layers 5-7, the film roll is again reversed for machine pass 3. Here, though, sputtering target pairs 1,2 (silicon) are turned off and sputtering target pair 7,8 ($SiO_2$) is re-started, allowing layers 8-10 to be completed. As with machine passes 1 and 2, in-line optical spectrometry is used to maintain process control limits.

Upon completion of layer 10, the sputtering sources are shut off, sputtering gases are removed and the film roll is wound to the end. The vacuum chamber pumping is closed, nitrogen or air chamber venting is applied, raising the chamber pressure to atmospheric pressure for film roll removal.

Multilayer optical films (MOF) may be made from polymeric materials by co-extrusion (U.S. Pat. No. 6,667,095) or inorganic materials by deposition techniques (as described above). Polymeric MOFs typically have smaller index contrast (An), therefore request more layers than inorganic MOFs to achieve the same level of reflectivity. However, polymeric MOFs can be made by large-scale polymer processes which are more cost-effective than inorganic MOFs made by deposition. Here, both the polymeric MOFs and inorganic MOFs can be integrated with the metasurface film as a substrate. The choice between polymeric and inorganic MOFs will be made based on specific applications.

Step f: Adhesion Promoter on Top of SiAlOx (to Facilitate Adhesion of Tri-Layer Sandwich to the Low-Land Patterned Acrylate)

7.5 nm of Compound 06 was die coated out of MEK on the SiAlOx at 6 m/min. The solvent was evaporated and the film was annealed at 93 degrees C. for 1.5 minutes. The Compound 06 was then cured using a fusion E bulb.
Step g: Lamination
Coated tooling film was laminated to SiAlOx+Compound 06 film with a 90 durometer nip and a water-heated roll set at 77 degrees C. at 3 m/min. The film was then cured with a 600 W fusion H bulb.
Step h: Peeling
The structured acrylate was peeled from the structured HMDSO film onto the SiAlOx film shortly after the water-heated roll (web twists were minimized to reduce strain). All films were tensioned at approximately 18 kg/m, still running at 3 m/min.
Steps i and j: Etching Residual Layer and Breakthrough SiAlOx Mask
These steps can be done either separately, as an oxygen etch followed by a fluorine etch, or subsequently during a single fluorine etch. The latter path was chosen here. In this case, the reactive ion etch was performed with 100 sccm of NF3, at 7500 watts run at 3.75 m/min at a pressure of 0.4 Pa.
Step k: Break-Through Etch
A second reactive ion etch with 700 sccm of O2 at 0.04 Pa base pressure at 7500 watts run at 4.5 m/min at a pressure of 0.7 Pa removed the transfer layer in the sections where the mask had been removed.
Step l: High Index Back-Fill
Etched high-aspect ratio features was processed in a spatial rotary ALD machine. $TiO_2$ was deposited using titanium tetraisopropoxide (TTIP) heated to 65 degrees C. (passive delivery), and a DC plasma discharge (350 mA) in an environment of 133 Pa $N_2$ and 40 Pa $O_2$. The chamber and substrate were heated to 80 degrees C. The substrate was secured to a platen rotating at 30 RPM, with one precursor and plasma exposure per revolution, for a total of 4688 ALD cycles to yield a $TiO_2$ layer 217 nm in thickness, and having a refractive index of 2.33, measured at a wavelength of 632 nm.

Example 2: Simulation Results (FIGS. 9-12)

To validate the principle, we performed numerical simulations of the optical film consists of both the MOF and the metasurface. The metasurface design is adapted from a published study by Shi et al (T. Shi et al., "All-Dielectric Kissing-Dimer Metagratings for Asymmetric High Diffraction," *Adv. Opt. Mater.*, vol. 1901389, p. 1901389, 2019) which enables diffraction of light into high propagation angles to couple into the Brewster angle of the MOF.

An exemplary inorganic MOF with 10 layers of alternating Si (n~4) and $SiO_2$ (n~1.5) is designed to exhibit the Brewster angle effect. Although this specific example is made with inorganic material, similar behavior is expected with polymeric MOFs with 100s of layers of low index contrast material pairs, such as PEN (Polyethylene Naphthalate, n=1.65, un-oriented) and PMMA (Poly(methyl methacrylate), n=1.49). More examples of polymeric MOFs can be found in U.S. Pat. No. 6,667,095. In general, multilayer optical films with polymeric material pairs have lower reflectance due to smaller index contrast given the same number of layers. Therefore, more layers are needed for the polymeric MOFs to achieve the same level of reflectance as the inorganic counterpart. Additionally, lower index contrast will result in a smaller Brewster angle (~50° vs ~70°) which will shift the angular transmission window to a different location. However, the general principle of how the MOF interacting with the metasurface and the resultant optical function remain unchanged whether the MOF is made with inorganic or polymeric material pairs. By using an inorganic MOF with fewer layers, it reduces the computational time and yield similar results that can be extended to polymeric MOFs.

Figure 9:
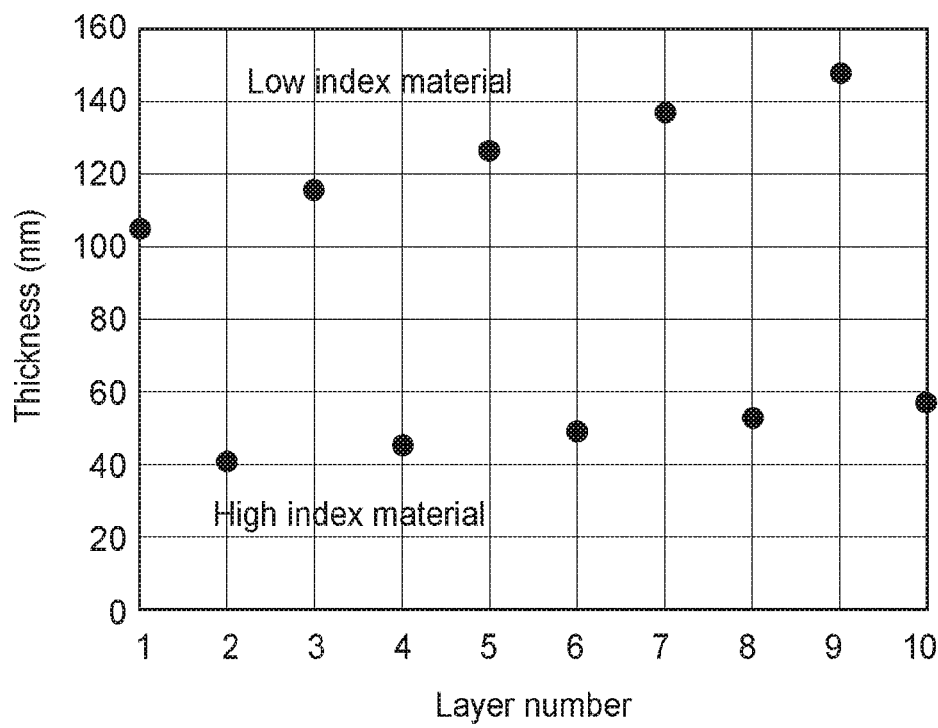
FIG. 9 is a graph of layer thickness profile of the 10-layer MOF stack of Example 2.
Figure 10:
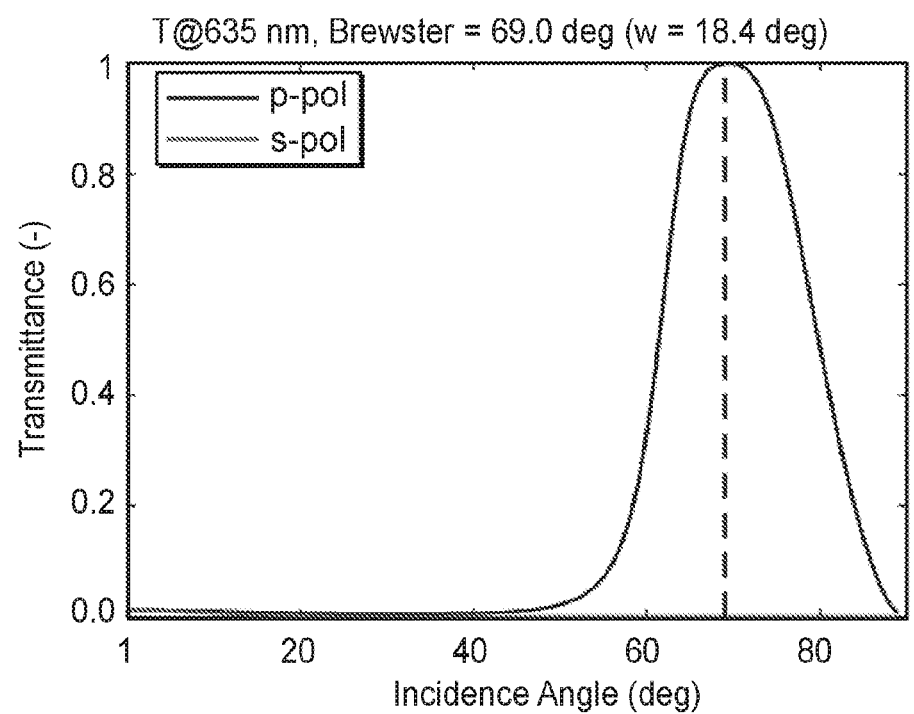
FIG. 10 is a graph of light transmittance as a function of incidence angle of the 10-layer MOF stack of Example 2.

The design of the 10-layer MOF is shown in FIG. 9 and FIG. 10. FIG. 9 illustrates the layer thickness profile of the 10-layer MOF stack. The refractive indices are 1.5 and 4 for low and high index material respectively. FIG. 10 illustrates the transmittance as a function of incidence angle of the MOF. The incidence medium has the same index as the low index material (1.5). The Brewster angle of the MOF is 69° and the angular width of the Brewster window is 18.4°. This behavior is equivalent with polymeric MOFs with more layers of low index contrast.

To demonstrate the coupling between the metasurface and MOF, we used Rigorous Coupled Wave Analysis (RCWA) to simulate the light interaction with the structure. The simulation is performed using an open-source RCWA package S4 (V. Liu and S. Fan, "S 4: A free electromagnetic solver for layered periodic structures," *Comput. Phys. Commun.*, vol. 183, no. 10, pp. 2233-2244, 2012) and the results are also validated using commercial FDTD package (Lumerical). Two cases are studied corresponding to FIG. 8 and FIG. 7 which are summarized in Table 1.

TABLE 1

| | Film construction (top to bottom) | Operating wavelength | Brewster angle | Incidence at Brewster angle | Incidence at other angles |
|---|---|---|---|---|---|
| Case 1 | Air<br>Metasurface<br>MOF<br>Lightguide | 635 nm | 69° | Transmitting p-polarized light; Reflecting s-polarized light | Reflecting both polarizations |
| Case 2 | Air<br>Metasurface<br>MOF<br>Metasurface<br>Air | 635 nm | 69° | Transmitting p-polarized light; Reflecting s-polarized light | Reflecting both polarizations |

Figure 11:
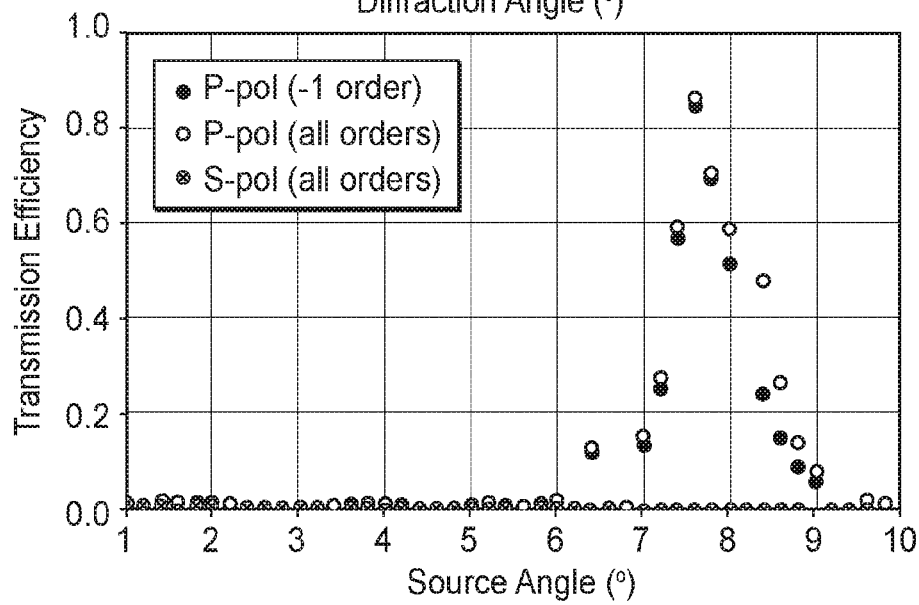
FIG. 11 is a graph of light transmittance as a function of incidence angle of the illustrative optical metasurface film construction of FIG. 3 of Example 2.

In case 1, the metasurface and MOF film is laminated onto a light guide with matched index of the low-index material of the MOF (FIG. 8). A light source with emission at 635 nm is embedded in the light guide region in the simulation domain. The transmission as a function of incidence angle is shown in FIG. 11. As expected, the film only transmits p-polarized light close to the Brewster angle (~69° in this case) and reflects s-polarized light at all angles. Significant electromagnetic energy is transmitted through the film only at near the Brewster angle for p-polarized light, validating the proposed operating principle.

Figure 12:
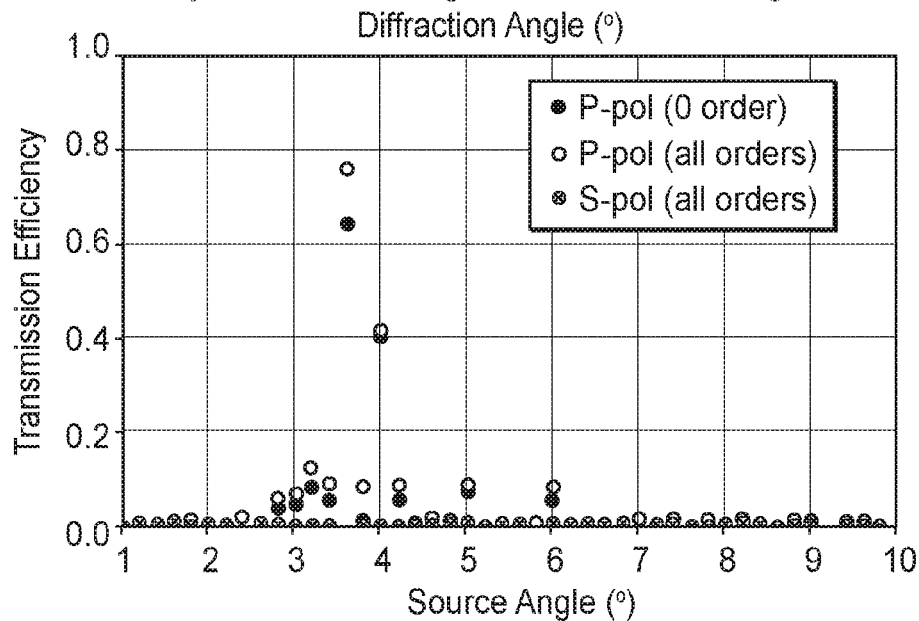
FIG. 12 is a graph of light transmittance as a function of incidence angle of the of the illustrative optical metasurface film construction of FIG. 4 of Example 2.

In case 2, the construction in FIG. 7 including two identical metasurface layers on both side of MOF is studied. This construction allows operation with light incident from air. The transmission as a function on incidence angle are shown in FIG. 12. The structure only transmits p-polarized light at ~26° and reflects light at all other angles.

The simulations presented here are a subset of broader examples that can be achieved using the same principle. The transmission angle (Brewster angle of MOF), operating wavelength, and spectral bandwidth can be varied and optimized depending on specific requirements for applications.

The invention claimed is:

1. An optical metasurface film, comprising:
a flexible polymeric film having a first major surface;
a patterned polymer layer having a first surface proximate to the first major surface of the flexible polymeric film and having a second nanostructured surface opposite the first surface;
a refractive index contrast layer comprising a refractive index contrast material adjacent to the nanostructured surface of the patterned polymer layer forming a nanostructured bilayer with a nanostructured interface, the nanostructured bilayer comprising a plurality of nanostructures disposed on the flexible polymeric film, wherein the nanostructured bilayer acts locally on an amplitude, phase, or polarization of light, or a combination thereof and imparts a light phase shift that varies as a function of position of the nanostructured bilayer on the flexible polymeric film, and the light phase shift of the nanostructured bilayer defines a predetermined operative phase profile of the optical metasurface film; and
a light reflecting layer in optical communication with the nanostructured bilayer,
wherein the light reflecting layer separates the flexible polymeric film from the nanostructured bilayer.

2. The optical metasurface film according to claim 1, wherein light reflected from the light reflecting layer is altered by the nanostructured bilayer.

3. The optical metasurface film according to claim 2, wherein the light reflected has a wavelength value in a range from 380 to 1600 nm, or from 280 to 750 nm, or from 750 to 1600 nm.

4. The optical metasurface film according to claim 1, wherein light transmitted through the light reflecting layer is altered by the nanostructured bilayer.

5. The optical metasurface film according to claim 4, wherein the light transmitted has a wavelength value in a range from 380 to 1600 nm, or from 280 to 750 nm, or from 750 to 1600 nm.

6. The optical metasurface film according to claim 1, wherein the light reflecting layer comprises multilayer optical film.

7. The optical metasurface film according to claim 1, wherein the light reflecting layer comprises polymeric multilayer optical film.

8. The optical metasurface film according to claim 1, wherein the light reflecting layer comprises a polarizer.

9. The optical metasurface film according to claim 1, wherein the nanostructured bilayer is defined by solid materials.

10. The optical metasurface film according to claim 1, wherein the refractive index contrast material has a first refractive index value and the patterned polymer layer has a second refractive index value being at least 0.25 different than, or 0.5 different than, or 0.75 different than, or 1.0 different than, or 1.4 different than the first refractive index value.

11. The optical metasurface film according to claim 1, wherein the nanostructured bilayer is defined by a plurality of nanostructures embedded into the refractive index contrast layer.

12. The optical metasurface film according to claim 1, wherein the refractive index contrast material comprises a metal oxide or metal nitride.

13. The optical metasurface film according to claim 1, wherein the refractive index contrast material comprises at least one of titanium, zirconium, tantalum, hafnium, niobium, zinc, or cerium; an oxide of titanium, zirconium, tantalum, hafnium, niobium, zinc, or cerium; a nitride of titanium, zirconium, tantalum, hafnium, niobium, zinc, or cerium; a sulfide of titanium, zirconium, tantalum, hafnium, niobium, zinc, or cerium; or a combination thereof.

14. The optical metasurface film according to claim 1, wherein the patterned polymer layer comprises a fluoropolymer, (meth)acrylate (co)polymer, or silica containing polymers.

15. The optical metasurface film according to claim 1, wherein the patterned polymer layer comprises (meth)acrylate and the refractive index contrast material comprises titanium dioxide.

16. An optical metasurface film, comprising:
a flexible polymeric film having a first major surface;
a patterned polymer layer having a first surface proximate to the first major surface of the flexible polymeric film and having a second nanostructured surface opposite the first surface;
a refractive index contrast layer comprising a refractive index contrast material adjacent to the nanostructured surface of the patterned polymer layer forming a nanostructured bilayer with a nanostructured interface, the nanostructured bilayer comprising a plurality of nanostructures disposed on the flexible polymeric film, wherein the nanostructured bilayer acts locally on an amplitude, phase, or polarization of light, or a combination thereof and imparts a light phase shift that varies as a function of position of the nanostructured bilayer on the flexible polymeric film, and the light phase shift of the nanostructured bilayer defines a predetermined operative phase profile of the optical metasurface film;
a light reflecting layer in optical communication with the nanostructured bilayer; and
a second light reflecting layer, wherein the nanostructured bilayer separates the light reflecting layer from the second light reflecting layer.

17. An optical metasurface film, comprising:
a flexible polymeric film having a first major surface;
a patterned polymer layer having a first surface proximate to the first major surface of the flexible polymeric film and having a second nanostructured surface opposite the first surface;
a refractive index contrast layer comprising a refractive index contrast material adjacent to the nanostructured surface of the patterned polymer layer forming a nanostructured bilayer with a nanostructured interface, the nanostructured bilayer comprising a plurality of nanostructures disposed on the flexible polymeric film, wherein the nanostructured bilayer acts locally on an amplitude, phase, or polarization of light, or a combination thereof and imparts a light phase shift that varies as a function of position of the nanostructured bilayer on the flexible polymeric film, and the light phase shift of the nanostructured bilayer defines a predetermined operative phase profile of the optical metasurface film;

a light reflecting layer in optical communication with the nanostructured bilayer; and a second nanostructured bilayer, wherein the light reflecting layer separates the nanostructured bilayer from the second nanostructured bilayer.

18. An optical metasurface film, comprising:

a flexible polymeric film having a first major surface;

a patterned polymer layer having a first surface proximate to the first major surface of the flexible polymeric film and having a second nanostructured surface opposite the first surface;

a refractive index contrast layer comprising a refractive index contrast material adjacent to the nanostructured surface of the patterned polymer layer forming a nanostructured bilayer with a nanostructured interface, the nanostructured bilayer comprising a plurality of nanostructures disposed on the flexible polymeric film, wherein the nanostructured bilayer acts locally on an amplitude, phase, or polarization of light, or a combination thereof and imparts a light phase shift that varies as a function of position of the nanostructured bilayer on the flexible polymeric film, and the light phase shift of the nanostructured bilayer defines a predetermined operative phase profile of the optical metasurface film; and a light reflecting layer in optical communication with the nanostructured bilayer, wherein the patterned polymer layer comprises fluoroacrylate and the refractive index contrast material comprises titanium dioxide.

* * * * *